US010200872B2

(12) United States Patent
Sakhnini et al.

(10) Patent No.: US 10,200,872 B2
(45) Date of Patent: Feb. 5, 2019

(54) DC SUBCARRIER HANDLING IN NARROWBAND DEVICES

(71) Applicant: QUALCOMM Incorporated, San Diego, CA (US)

(72) Inventors: Iyab Issam Sakhnini, San Diego, CA (US); Hao Xu, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 38 days.

(21) Appl. No.: 14/877,741

(22) Filed: Oct. 7, 2015

(65) Prior Publication Data

US 2016/0105803 A1 Apr. 14, 2016

Related U.S. Application Data

(60) Provisional application No. 62/061,655, filed on Oct. 8, 2014.

(51) Int. Cl.
*H04W 16/12* (2009.01)
*H04L 27/26* (2006.01)
(Continued)

(52) U.S. Cl.
CPC .......... *H04W 16/12* (2013.01); *H04L 5/0044* (2013.01); *H04L 5/0064* (2013.01);
(Continued)

(58) Field of Classification Search
CPC .... H04W 16/12; H04W 4/005; H04L 5/0044; H04L 5/0064; H04L 27/265; H04L 5/0037; H04L 5/09
(Continued)

(56) References Cited

U.S. PATENT DOCUMENTS

2013/0114393 A1* 5/2013 Lee .............. H04L 5/0048
370/210
2013/0272215 A1* 10/2013 Khoryaev ............. H04W 28/02
370/329
(Continued)

FOREIGN PATENT DOCUMENTS

EP 2592778 A2 5/2013
GB 2506418 A 4/2014

OTHER PUBLICATIONS

Ericsson, "UE Complexity Reduction for MTC," 3GPP TSG-RAN WG1 Meeting #78bis, R1-143785, Ljubljana, Slovenia, Oct. 6-10, 2014, 6 pgs., XP_50875105A, 3rd Generation Partnership Project.
(Continued)

*Primary Examiner* — Edward F Urban
*Assistant Examiner* — Ralph H Justus
(74) *Attorney, Agent, or Firm* — Holland & Hart LLP/Qualcomm

(57) ABSTRACT

Methods, systems, and devices are described for direct current (DC) subcarrier handling for narrowband user equipment (UE). A UE may identify a narrow bandwidth region allocated for operation within a wide bandwidth carrier, determine that the narrow bandwidth region is centered about a different frequency than a center subcarrier of the wide bandwidth carrier, and, accordingly, select an operating mode. Various operating modes may include down-converting a carrier frequency of the allocated narrow bandwidth region. A base station may support narrowband UE operation by determining that the narrow bandwidth region is centered about a different frequency than a center subcarrier of the wide bandwidth carrier and rate matching subcarriers of the narrow bandwidth region around tones of a center frequency of the narrow bandwidth region.

26 Claims, 17 Drawing Sheets

(51) Int. Cl.
*H04L 5/00* (2006.01)
*H04W 4/70* (2018.01)

(52) U.S. Cl.
CPC ......... *H04L 27/265* (2013.01); *H04L 5/0037* (2013.01); *H04W 4/70* (2018.02)

(58) Field of Classification Search
USPC .......................................................... 455/45
See application file for complete search history.

(56) References Cited

U.S. PATENT DOCUMENTS

| | | | | |
|---|---|---|---|---|
| 2013/0301549 A1* | 11/2013 | Chen | ................... | H04W 76/048 370/329 |
| 2014/0194133 A1* | 7/2014 | Darwood | .............. | H04L 5/0041 455/450 |
| 2015/0146640 A1* | 5/2015 | Baldemair | .......... | H04L 27/2666 370/329 |
| 2015/0181603 A1* | 6/2015 | Wakabayashi | ........ | H04L 5/0041 370/329 |
| 2015/0381330 A1* | 12/2015 | Chen | .................... | H04L 5/0046 370/329 |
| 2016/0072614 A1* | 3/2016 | Blankenship | ......... | H04L 5/0046 370/329 |

OTHER PUBLICATIONS

Huawei et al., "On the Relationship Between Re-tuning Time and Bandwidth Reduction," 3GPP TSG RAN WG1 Meeting #78bis, R1-143710, Ljubljana, Slovenia, Oct. 6-10, 2014, 5 pgs., XP_50869396A, 3rd Generation Partnership Project.

ISA/EPO, International Search Report and Written Opinion of the International Searching Authority, Int'l. App. No. PCT/US2015/054714, Jan. 19, 2016, European Patent Office, Rijswijk, NL, 13 pgs.

* cited by examiner

US 10,200,872 B2

DC SUBCARRIER HANDLING IN NARROWBAND DEVICES

CROSS REFERENCES

The present application for patent claims priority to U.S. Provisional Patent Application No. 62/061,655 by Sakhnini et al., entitled "DC Subcarrier Handling in Narrowband Devices," filed Oct. 8, 2014, assigned to the assignee hereof, and expressly incorporated by reference herein.

BACKGROUND

Field of Disclosure

The following relates generally to wireless communication and more specifically to direct current (DC) subcarrier handling in narrowband devices.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

By way of example, a wireless multiple-access communications system may include a number of base stations, each simultaneously supporting communication for multiple communication devices, which may be otherwise known as user equipment (UEs). A base station may communicate with the communication devices on downlink channels (e.g., for transmissions from a base station to a UE) and uplink channels (e.g., for transmissions from a UE to a base station).

In LTE systems, in order to avoid possible distortion or interference to carrier frequency caused by possible local oscillator leakage, the center subcarrier within a configured bandwidth may be specially handled. This center subcarrier may be referred to as a DC subcarrier. UEs may use the DC subcarrier on the downlink to locate the center frequency of the bandwidth. Generally, on the downlink, the DC subcarrier represents an empty or null subcarrier. UEs may anticipate this, and may configure a Fast Fourier Transform (FFT) accordingly. For the uplink, an empty or unused DC subcarrier may increase the peak to average power ration (PAPR) of uplink transmissions; so instead of a null subcarrier, a center subcarrier of the uplink carrier frequency may be modulated like other subcarriers. But to minimize distortion, subcarriers on the uplink may be shifted in frequency by a half subcarrier spacing (e.g., 7.5 kHz). This may decrease interference for any one subcarrier. For systems employing narrow bandwidth devices within a wide bandwidth carrier frequency may, however, use certain UE or base station operations to account for a DC subcarrier that is not centered with respect to the frequency region where the narrow bandwidth device is operating.

SUMMARY

Systems, methods, and apparatuses for DC subcarrier handling in narrowband devices are described. A UE may identify a narrow bandwidth region allocated for operation within a wide bandwidth carrier. The UE may determine that the narrow bandwidth region may be centered about a different frequency than a center subcarrier of the wide bandwidth carrier. The UE may select an operating mode associated with a center frequency of the narrow bandwidth region based on the determining.

Additionally or alternatively, a base station may identify a narrow bandwidth region allocated for operation within a wide bandwidth carrier. The base station may determine that the narrow bandwidth region may be centered about a different frequency than a center subcarrier of the wide bandwidth carrier. The base station may transmit an empty subcarrier at a center frequency of the narrow bandwidth region, and the base station may rate match subcarriers of the narrow bandwidth region around tones of the empty subcarrier.

A base station may also compensate for uplink transmission by a narrow bandwidth device (e.g., a narrowband UE). For instance, a first base station may be in communication with wideband UE. The first base station may determine that a narrowband UE may be in communication with a second base station, and the narrowband UE may be utilizing a narrow bandwidth region within a wide bandwidth carrier, such that the narrow bandwidth region may be centered about a different frequency than a center subcarrier of the wide bandwidth carrier. The first base station may adjust communication with the wideband UE based on determining that the narrowband UE may be in communication with the second base station.

A method of wireless communication at a UE is described. The method may include identifying a narrow bandwidth region allocated for operation within a wide bandwidth carrier, determining that the narrow bandwidth region is centered about a different frequency than a center subcarrier of the wide bandwidth carrier, and selecting an operating mode associated with a center frequency of the narrow bandwidth region based at least in part on the determining.

An apparatus for wireless communication at a UE is described. The apparatus may include means for identifying a narrow bandwidth region allocated for operation within a wide bandwidth carrier, means for determining that the narrow bandwidth region is centered about a different frequency than a center subcarrier of the wide bandwidth carrier, and means for selecting an operating mode associated with a center frequency of the narrow bandwidth region based at least in part on the determining.

A further apparatus for wireless communication at a UE is described. The apparatus may include a processor, memory in electronic communication with the processor, and instructions stored in the memory, wherein the instructions are executable by the processor to identify a narrow bandwidth region allocated for operation within a wide bandwidth carrier, determine that the narrow bandwidth region is centered about a different frequency than a center subcarrier of the wide bandwidth carrier, and select an operating mode associated with a center frequency of the narrow bandwidth region based at least in part on the determining.

A non-transitory computer-readable medium storing code for wireless communication at a UE is described. The code may include instructions executable to identify a narrow bandwidth region allocated for operation within a wide bandwidth carrier, determine that the narrow bandwidth region is centered about a different frequency than a center subcarrier of the wide bandwidth carrier, and select an operating mode associated with a center frequency of the narrow bandwidth region based at least in part on the determining.

In some examples of the method, apparatuses, or non-transitory computer-readable medium described above, selecting the operating mode comprises puncturing a set of REs corresponding to an expected direct current (DC) subcarrier location. Additionally or alternatively, some examples may include determining that the narrow bandwidth region comprises the center subcarrier of the wide bandwidth carrier, receiving a downlink transmission on subcarriers of the narrow bandwidth region, and analyzing the received downlink transmission based at least in part on the determination that the narrow bandwidth region comprises the center subcarrier of the wide bandwidth carrier.

In some examples of the method, apparatuses, or non-transitory computer-readable medium described above, analyzing the received downlink transmission comprises down-converting a carrier frequency of the allocated narrow band region so that the center subcarrier of the wide bandwidth carrier is effectively centered within the narrow bandwidth region. Some examples may also include and adjusting a fast Fourier transform (FFT) operation based on a location of the center subcarrier of the wide bandwidth carrier. Additionally or alternatively, some examples may include receiving system information on a center bandwidth region of the wide bandwidth carrier, receiving an indication of the narrowband region from a base station, wherein identifying the narrow bandwidth region is based on the received indication, and determining that the narrow bandwidth region is centered about a different frequency than the center subcarrier of the wide bandwidth carrier is based on the received system information and identifying the narrow bandwidth region.

Some examples of the method, apparatuses, or non-transitory computer-readable medium described above may further include determining that the narrow bandwidth region excludes the center subcarrier of the wide bandwidth carrier, receiving a downlink transmission on subcarriers of the narrow bandwidth region, and analyzing the received downlink transmission based at least in part on the determination that the narrow bandwidth region excludes the center subcarrier of the wide bandwidth carrier. Additionally or alternatively, in some examples analyzing the received downlink transmission comprises down-converting the allocated narrow band region such that the center subcarrier of the wide bandwidth carrier is adjacent to the narrow bandwidth region, wherein the down-converting is based on a carrier frequency, a bandwidth of the narrow bandwidth region, and a configurable value. Some examples may also include adjusting an FFT operation based on a location of the center subcarrier of the wide bandwidth carrier.

Some examples of the method, apparatuses, or non-transitory computer-readable medium described above may further include receiving system information on a center bandwidth region of the wide bandwidth carrier, receiving an indication of the narrowband region from a base station, wherein identifying the narrow bandwidth region is based on the received indication, and determining that the narrow bandwidth region is centered about a different frequency than the center subcarrier of the wide bandwidth carrier is based on the received system information and identifying the narrow bandwidth region.

A method of wireless communication at a base station is described. The method may include identifying a narrow bandwidth region allocated for operation within a wide bandwidth carrier, determining that the narrow bandwidth region is centered about a different frequency than a center subcarrier of the wide bandwidth carrier, and communicating with a user equipment (UE) by rate matching subcarriers of the narrow bandwidth region around tones of a center frequency of the narrow bandwidth region.

An apparatus for wireless communication at a base station is described. The apparatus may include means for identifying a narrow bandwidth region allocated for operation within a wide bandwidth carrier, means for determining that the narrow bandwidth region is centered about a different frequency than a center subcarrier of the wide bandwidth carrier, and means for communicating with a user equipment (UE) by rate matching subcarriers of the narrow bandwidth region around tones of a center frequency of the narrow bandwidth region.

A further apparatus for wireless communication at a base station is described. The apparatus may include a processor, memory in electronic communication with the processor, and instructions stored in the memory, wherein the instructions are executable by the processor to identify a narrow bandwidth region allocated for operation within a wide bandwidth carrier, determine that the narrow bandwidth region is centered about a different frequency than a center subcarrier of the wide bandwidth carrier, and communicate with a user equipment (UE) by rate matching subcarriers of the narrow bandwidth region around tones of a center frequency of the narrow bandwidth region.

A non-transitory computer-readable medium storing code for wireless communication at a base station is described. The code may include instructions executable to identify a narrow bandwidth region allocated for operation within a wide bandwidth carrier, determine that the narrow bandwidth region is centered about a different frequency than a center subcarrier of the wide bandwidth carrier, and communicate with a user equipment (UE) by rate matching subcarriers of the narrow bandwidth region around tones of a center frequency of the narrow bandwidth region.

Some examples of the method, apparatuses, or non-transitory computer-readable medium described above may further include transmitting an empty subcarrier at the center frequency of the narrow bandwidth region. Additionally or alternatively, some examples may include transmitting an empty subcarrier at the center frequency of the narrow bandwidth region or transmitting system information on a center bandwidth region of the wide bandwidth, or both. Some examples include transmitting an indication of the narrow bandwidth region to the UE. Additionally or alternatively, some examples may include transmitting downlink data on subcarriers of the narrow bandwidth region.

A method of wireless communication at a base station is described. The method may include identifying a wideband UE in communication with the first base station, determining that a narrowband UE is in communication with a second base station in the narrowband UE utilizing a narrow bandwidth region within a wide bandwidth carrier, wherein the narrow bandwidth region is centered about a different frequency than a center subcarrier of the wide bandwidth carrier, and adjusting communication with the wideband UE based at least in part on determining that the narrowband UE is in communication with the second base station.

An apparatus for wireless communication at a base station is described. The apparatus may include means for identifying a wideband UE in communication with the first base station, means for determining that a narrowband UE is in communication with a second base station in, the narrowband UE utilizing a narrow bandwidth region within a wide bandwidth carrier, wherein the narrow bandwidth region is centered about a different frequency than a center subcarrier of the wide bandwidth carrier, and means for adjusting communication with the wideband UE based at least in part on determining that the narrowband UE is in communication with the second base station.

A further apparatus for wireless communication at a base station is described. The apparatus may include a processor, memory in electronic communication with the processor, and instructions stored in the memory, wherein the instructions are executable by the processor to identify a wideband UE in communication with the first base station, determine that a narrowband UE is in communication with a second base station in, the narrowband UE utilizing a narrow bandwidth region within a wide bandwidth carrier, wherein the narrow bandwidth region is centered about a different frequency than a center subcarrier of the wide bandwidth carrier, and adjust communication with the wideband UE based at least in part on determining that the narrowband UE is in communication with the second base station.

A non-transitory computer-readable medium storing code for wireless communication at a base station is described. The code may include instructions executable to identify a wideband UE in communication with the first base station, determine that a narrowband UE is in communication with a second base station in, the narrowband UE utilizing a narrow bandwidth region within a wide bandwidth carrier, wherein the narrow bandwidth region is centered about a different frequency than a center subcarrier of the wide bandwidth carrier, and adjust communication with the wideband UE based at least in part on determining that the narrowband UE is in communication with the second base station.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
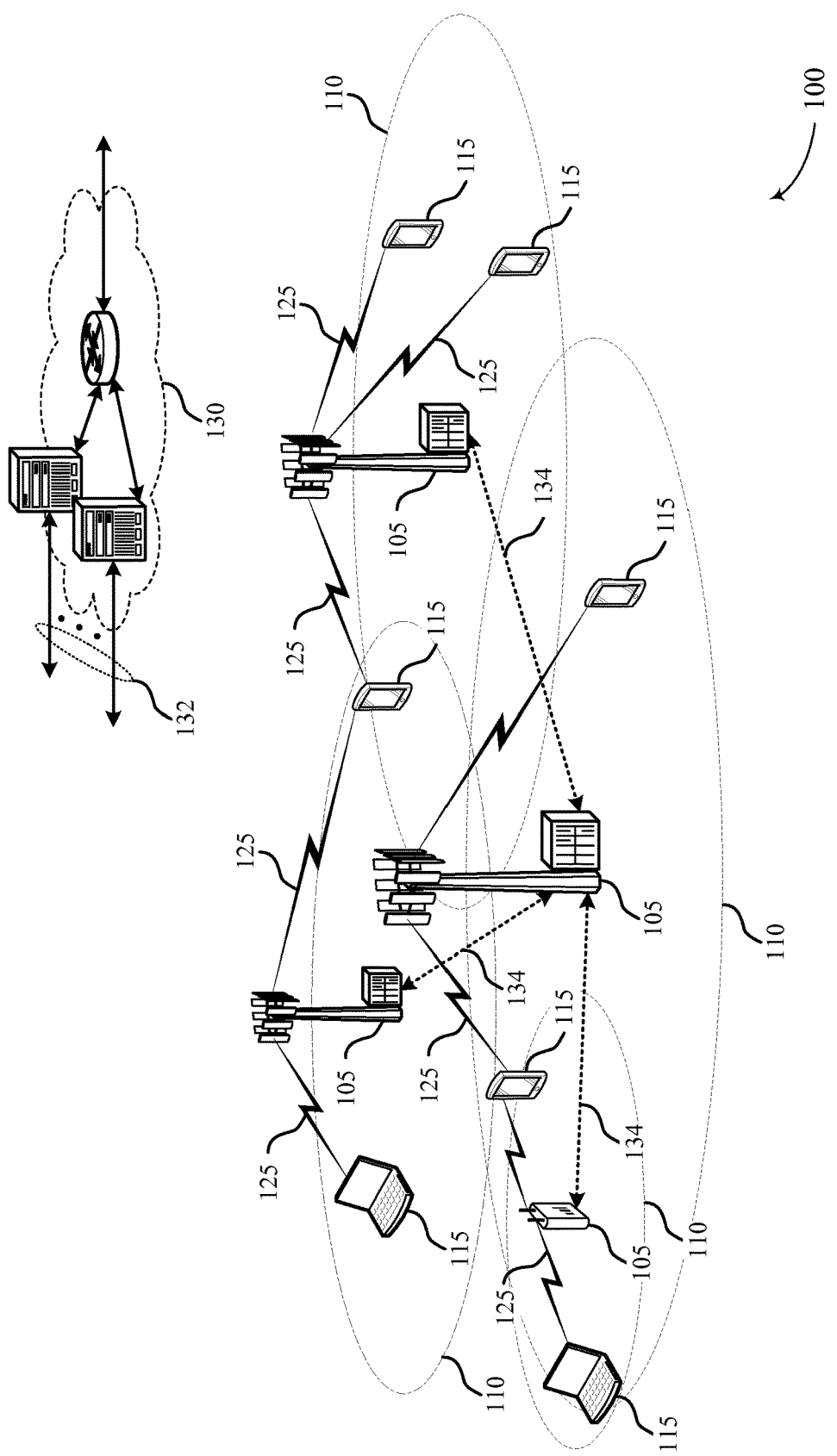
FIG. 1 illustrates an example of a wireless communications system for DC subcarrier handling in narrowband devices in accordance with various aspects of the present disclosure.

In certain LTE applications, including, for instance, enhanced machine type communication (eMTC) applications, a UE may operate with certain assumptions. For example, the UE may be limited to operation within a narrow bandwidth (or narrowband) (e.g., 1.4 MHz) radio frequency (RF) baseband for both uplink and downlink, and the UE may operate within an existing wide bandwidth (or wideband) (e.g., 20 MHz) system. In order to satisfy such operational limitations or specifications, a narrowband UE may use a portion of an available bandwidth—e.g., 1.4 MHz of an available 20 MHz.

To increase system capacity, and to increase the number of narrowband UEs capable of operating within, or able to access, a wideband system, different narrowband UEs may be assigned or allocated different portions of a wide bandwidth carrier. This may be accomplished by allowing a narrowband UE to acquire synchronization signals or system information (e.g., primary synchronization signal (PSS), secondary synchronization signal (SSS), or a physical broadcast channel (PBCH)) using the middle six (6) physical resource blocks (PRBs) (e.g., 1.4 MHz) of a wideband carrier. A network may then redirect the UE to some other 1.4 MHz band, other than the middle or center 1.4 MHz, within the wide band carrier. The UE may then operate within the 1.4 MHz region for both downlink and uplink using carrier frequencies different from the wideband carrier frequencies.

This operation outside the center 1.4 MHz may, however, lead to certain issues for downlink or uplink operations. For instance, for the downlink, the UE may expect to receive a DC subcarrier in the middle (or center) of the configured (e.g., narrow) bandwidth. But because the assigned or allocated narrow bandwidth is within the wide bandwidth system, and if the assigned or allocated narrow bandwidth is not in the center of the wide bandwidth system, the narrow bandwidth signal from the base station may not have a DC subcarrier. The consequence of this may be that the UE assumes empty tones (e.g., resource elements (REs)) while the REs are not truly empty. That is, the assumed location of the null subcarrier—the DC subcarrier—may include a signal. This may cause performance degradation.

For the uplink, a different problem may result. For a narrowband UE, the transmitter local oscillator leakage may distort parts of subcarriers (e.g., two (2) subcarriers) around the center subcarrier. At a base station, this may cause interference on these tones.

It is therefore apparent that downlink performance for narrowband UEs operating in a wideband system may be degraded. This may be due to the lack of an expected DC subcarrier on the downlink, or because of additional transmission on the uplink. In either case, UEs or base stations, or both, may employ DC subcarrier handling techniques to avoid performance degradation.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the present disclosure. The system 100 includes base stations 105, at least one UE 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up a portion of the coverage area (not shown). The wireless communications system 100 may include base stations 105 of different types (e.g., macro or small cell base stations). There may be overlapping geographic coverage areas 110 for different technologies.

In some examples, the wireless communications system 100 is a Long Term Evolution (LTE)/LTE-Advanced (LTE-A) network. In LTE/LTE-A networks, the term evolved node B (eNB) may be generally used to describe the base stations 105, while the term UE may be generally used to describe the UEs 115. The wireless communications system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier, or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or packet data convergence protocol (PDCP) layer may be IP-based. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARM) to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

Some types of wireless devices may provide for automated communication. Automated wireless devices, including the UEs 115, may include those implementing Machine-to-Machine (M2M) communication or Machine Type Communication (MTC). M2M or machine type communication (MTC) may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be MTC devices, such as those designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications. In some examples, the UEs 115 are eMTC devices, and may be narrowband devices configured to operate in a maximum of 1.4 MHz band.

The communication links 125 shown in wireless communications system 100 may include uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple subcarriers (e.g., waveform signals of different frequencies) modulated according to the various radio technologies described above. Each modulated signal may be sent on a different subcarrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

LTE systems may utilize orthogonal frequency division multiple access (OFDMA) on the DL and single carrier frequency division multiple access (SC-FDMA) on the UL. OFDMA and SC-FDMA partition the system bandwidth into multiple (K) orthogonal subcarriers, which are also commonly referred to as tones or bins. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guardband) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8, or 16 sub-bands. Accordingly, the communication links 125 may represent uplink or downlink communications on a narrowband within a wideband system. For instance, a communication link 125 may be a downlink or uplink on a 1.4 MHz within a 20 MHz carrier frequency, and the 1.4 MHz may not be centered about the 20 MHz center frequency (e.g., middle subcarriers).

In some embodiments of the system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Certain UEs 115, including eMTC devices, may initially receive synchronization information, a master information block (MIB), and system information block (SIBs) from a base station on a center 6 PRBs of a wideband carrier. This may include receiving PSS, SSS, and PBCH. Different SIBs may be defined according to the type of system information conveyed. SIB1 includes access information such as cell identity information, and may also indicate whether a UE 115 is allowed to camp on a cell. SIB1 also includes cell selection information (or cell selection parameters). Additionally, SIB1 includes scheduling information for other SIBs. SIB2 includes access information and parameters related to common and shared channels. SIB3 includes cell reselection parameters. SIB4 and SIB5 include reselection information about neighboring LTE cells. SIB6 through SIB8 include reselection information about non-LTE (e.g., Universal Mobile Telecommunications System (UMTS), GERAN, and code division multiple access (CDMA)) neighboring cells). SIB9 includes the name of a Home eNB. SIB10 through SIB12 include emergency notification information (e.g., tsunami and earthquake warnings). And SIB13 includes information related to multimedia broadcast multicast service (MBMS) configuration.

Upon receiving some or all system information, a UE 115, such an eMTC device, may be redirected to another 1.4 MHz band within the wideband carrier. The UE 115 may thus identify a narrow bandwidth region allocated for operation within a wide bandwidth carrier. The UE 115 may determine that the narrow bandwidth region may be centered about a different frequency than a center subcarrier of the wide bandwidth carrier. The UE may select an operating mode associated with a center frequency of the narrow bandwidth region based on the determining.

Or, in some examples, a base station 105 may identify a narrow bandwidth region allocated for UE 115 operation within a wide bandwidth carrier. The base station 105 may determine that the narrow bandwidth region may be centered about a different frequency than a center subcarrier of the wide bandwidth carrier. The base station 105 may transmit an empty subcarrier at a center frequency of the narrow bandwidth region, and the base station may rate match subcarriers of the narrow bandwidth region around tones of the empty subcarrier.

Figure 2:
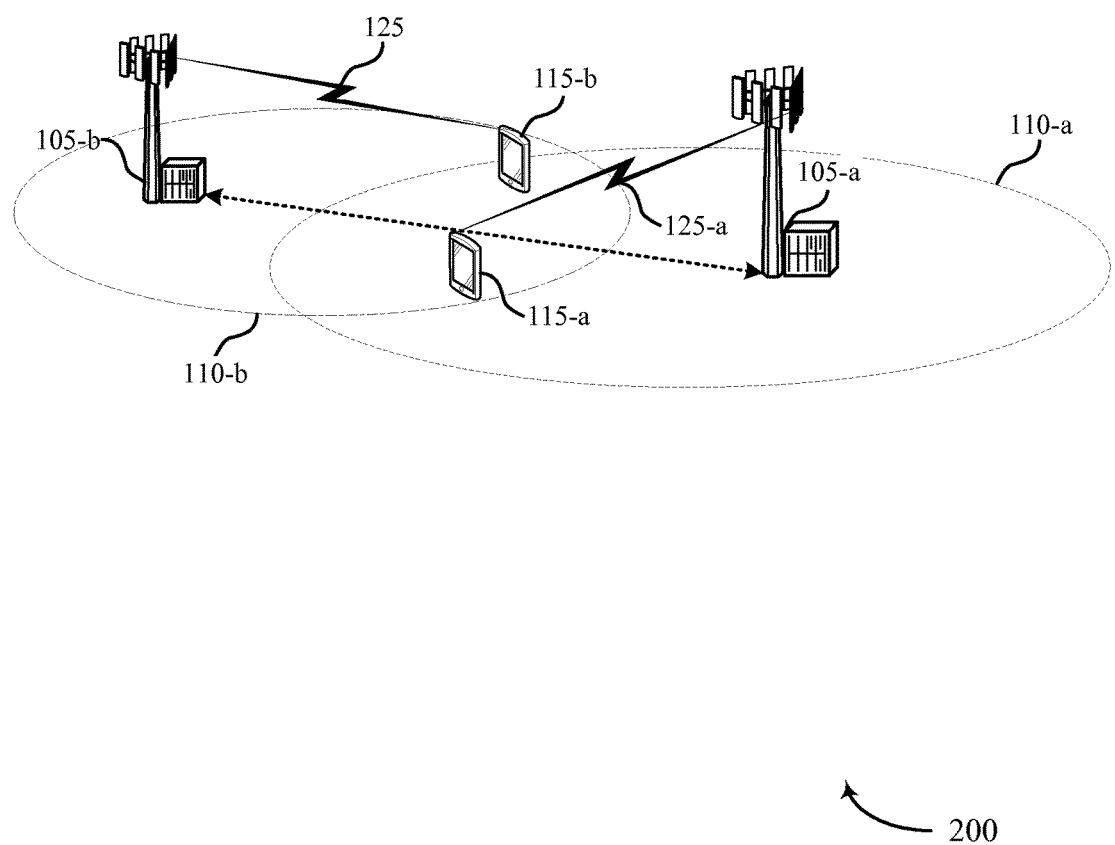
FIG. 2 illustrates an example of a wireless communications system for DC subcarrier handling in narrowband devices in accordance with various aspects of the present disclosure.

Next, FIG. 2 illustrates an example of a wireless communications system 200 for DC subcarrier handling in narrowband devices in accordance with various aspects of the present disclosure. Wireless communications system 200 may include UEs 115-*a* and 115-*b*, and base stations 105-*a* and 105-*b*, which may be examples of UEs 115 and base stations 105 described above with reference to FIG. 1.

In some examples, base station 105-*a* may identify a narrow bandwidth region allocated for UE 115-*a* operation within a wide bandwidth carrier. Base station 105-*a* may determine that the narrow bandwidth region may be centered about a different frequency than a center subcarrier of the wide bandwidth carrier. The base station 105-*a* may transmit an empty subcarrier (e.g., on communication link 125) at a center frequency of the narrow bandwidth region, and the base station may rate match subcarriers of the narrow bandwidth region around tones of the empty subcarrier.

For uplink operations, for instance, base station may 105-*a* may compensate for uplink transmission by a narrow bandwidth device (e.g., UE 115-*b*). For instance, base station 105-*a* may identify a wideband UE 115-*a* in communication with the base station 105-*a*. The base station may determine that a narrowband UE 115-*b* may be in communication with base station 105-*b* and the narrowband UE 115-*b* may be utilizing a narrow bandwidth region within a wide bandwidth carrier, where the narrow bandwidth region may be centered about a different frequency than a center subcarrier of the wide bandwidth carrier. The base station 105-*a* may adjust communication with the wideband UE 115-*a* based on determining that the narrowband UE 115-*b* is in communication with the base station 105-*b*.

Figure 3:
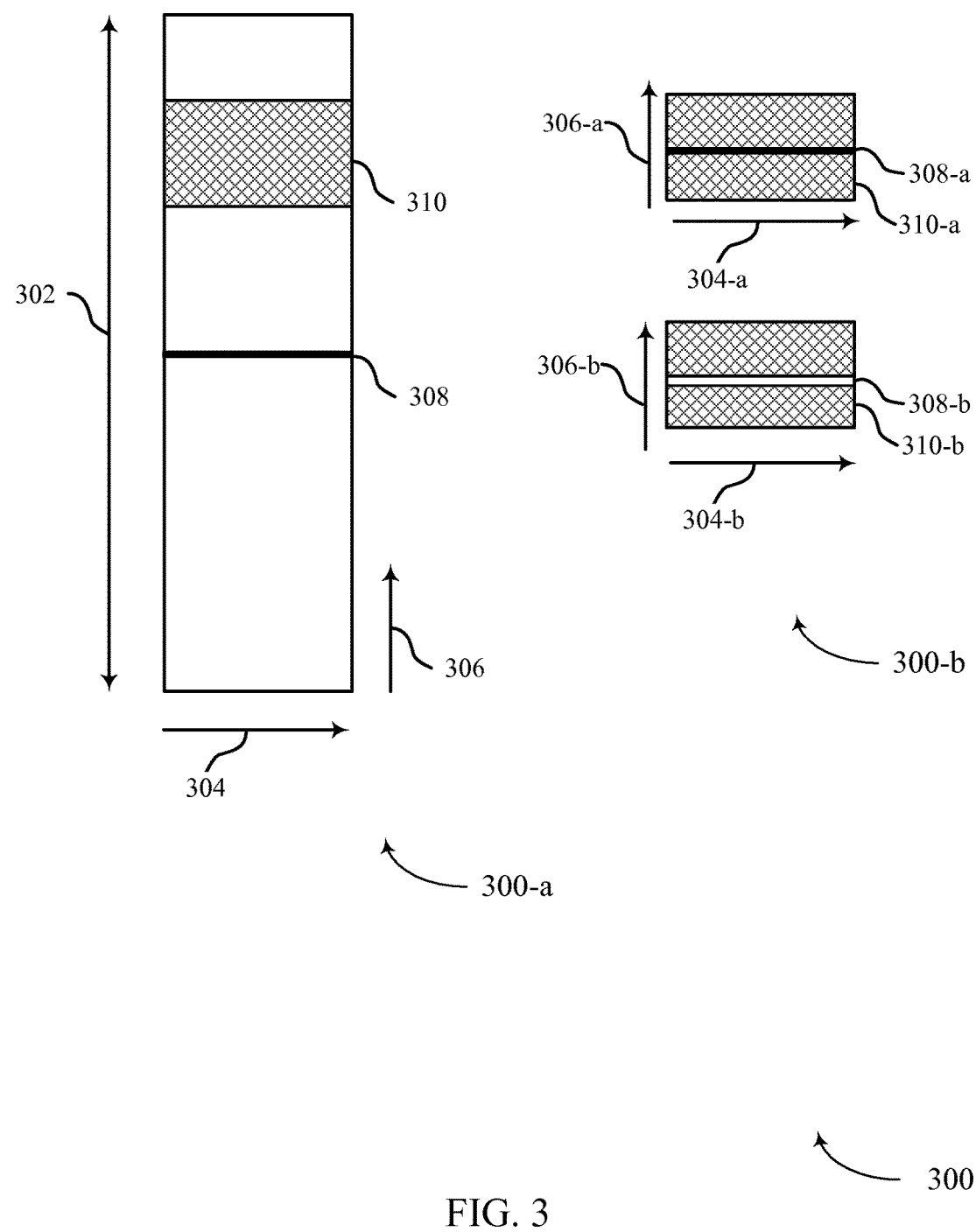
FIG. 3 illustrates an example of a narrow bandwidth system within a wide bandwidth system employing DC subcarrier handling in accordance with various aspects of the present disclosure.

FIG. 3 illustrates an example of a narrow bandwidth system 300 within a wide bandwidth system employing DC subcarrier handling in accordance with various aspects of the present disclosure. The system 300-*a* includes a wideband carrier 302 operating within a frequency 304 and time 306 region. The system 300-*a* includes a DC subcarrier 308 and a narrowband region 310, and the system 300-*a* may illustrate carrier operation within the systems described with reference to FIGS. 1-2. System 300-*b* illustrates one possible DC subcarrier handling option. In this example, a base station may not alter operation, but a UE may puncture the middle REs, which correspond to a supposed or assumed location of an empty DC subcarrier. This puncturing may represent a selected operating mode. For example, a UE operating in narrowband region 310-*a* may anticipate a DC subcarrier 308-*a*. But the UE may, as shown in narrowband region 310-*b*, puncture REs in DC subcarrier 308-*b*. That is, the UE may elect to not decode the REs in the expected location.

Alternative, a UE may select another operating mode. For instance, if a narrowband UE happens to be using the same center frequency as the wideband carrier, there may be no adjustment. But if the narrow band UE is using a different center frequency than is used in the wideband system, and if the DC subcarrier is within, but not centered within, the narrowband region, the UE may down convert subcarriers and adjust FFT operations to account for the DC subcarrier. Or if the narrowband UE is using a different center frequency than is used in the wideband system, and if the DC carrier is not within the narrowband region, the UE may down convert the subcarrier and adjust FFT operations more substantially.

Figure 4:
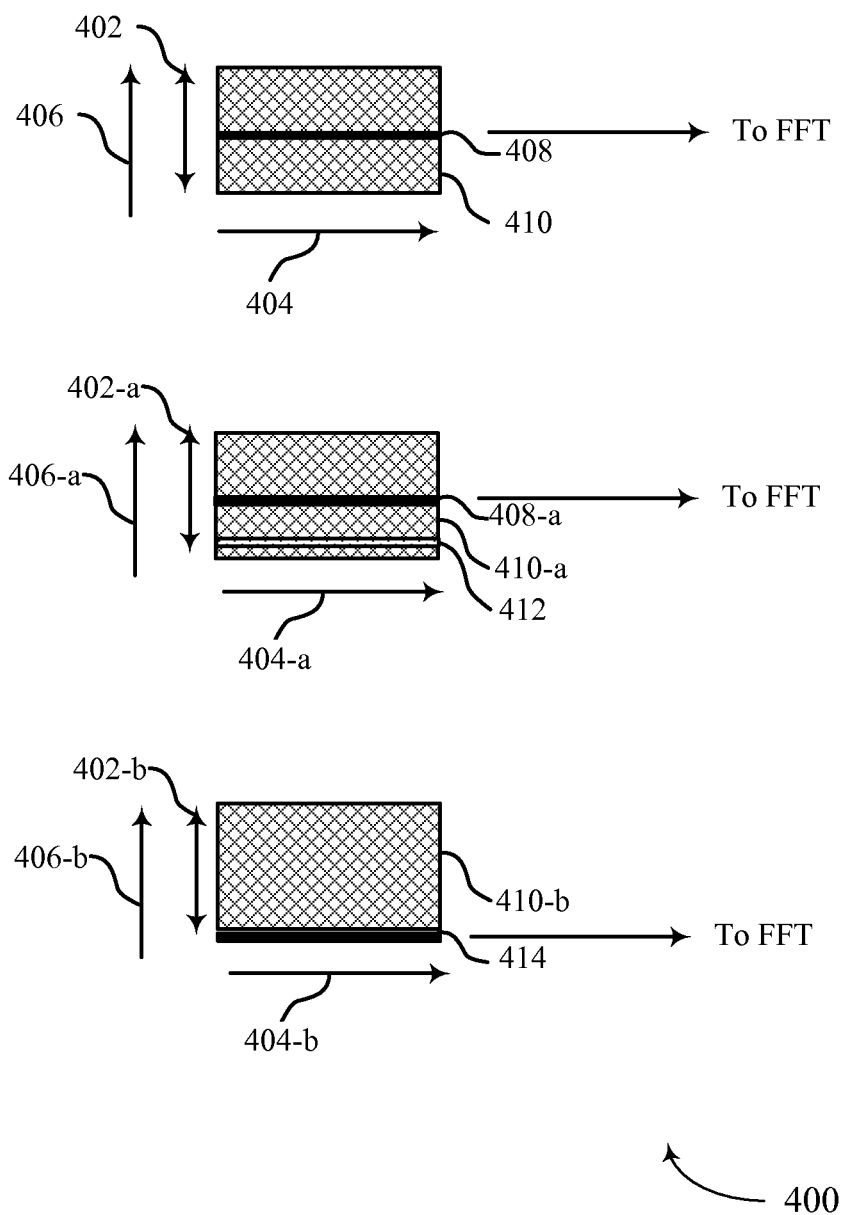
FIG. 4 illustrates an example of a narrow bandwidth system within a wide bandwidth system employing DC subcarrier handling in accordance with various aspects of the present disclosure.

FIG. 4 is an example of a narrow bandwidth system within a wide bandwidth system employing DC subcarrier handling in accordance with various aspects of the present disclosure. The system 400 includes narrowband carriers 402 operating within a time 404 and frequency 406 region. The system 400 may illustrate carrier operation within the systems described with reference to FIGS. 1-2. For example, a UE operating in narrowband region 410 may anticipate a DC subcarrier at center frequency 408. But the UE may determine that a center frequency 408-*a* is different from an actual location a DC subcarrier 412, even though the DC subcarrier 412 is within the narrowband region 410-*a*. For example, the UE may acquire system information while using the center 6 PRBs of a wideband carrier and then it may be redirected to the narrowband region 410-*a*. In some cases, the UE may use this information to determine the location of the DC subcarrier 412. In can then adjust its operation by taking the DC subcarrier 412 into consideration, or not (e.g., when doing an FFT operation), depending on the location of the DC subcarrier 412 with respect to the narrowband region 410-*a*.

In some examples, the UE may determine that a center frequency 408-*a* is different from an actual location a DC subcarrier 414, and the DC subcarrier 414 is excluded from the narrowband region 410-*b*. In such cases, the UE may down-convert the narrowband carrier frequency (e.g., subcarriers) such that the DC subcarrier is outside the allocated narrowband. In some cases, to down conversion may result in the narrow band region being adjacent to the DC subcarrier. This down conversion may be by carrier frequency. The down conversion may, for instance be by [carrier frequency]−[narrow bandwidth]/2+δ, where δ is UE configurable.

Figure 5:
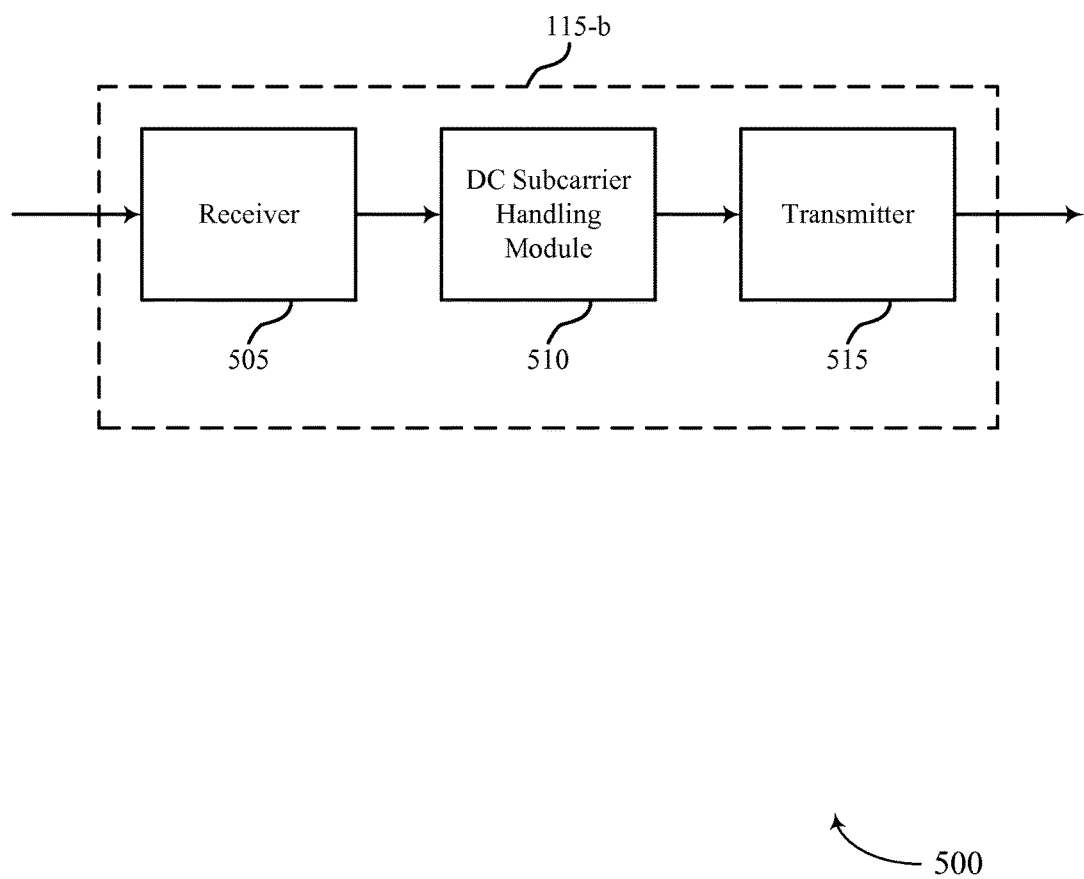
FIG. 5 shows a block diagram of a user equipment (UE) configured for DC subcarrier handling in narrowband devices in accordance with various aspects of the present disclosure.

FIG. 5 shows a block diagram 500 of a UE 115-*b* configured for DC subcarrier handling in narrowband devices in accordance with various aspects of the present disclosure. UE 115-*b* may be an example of aspects of a UE 115 described with reference to FIGS. 1-4. UE 115-*b* may include a receiver 505, a DC subcarrier handling module 510, or a transmitter 515. UE 115-*b* may also include a processor. Each of these components may be in communication with each other.

The components of UE 115-*b* may, individually or collectively, be implemented with at least one application specific integrated circuit (ASIC) adapted to perform some or all of the applicable functions in hardware. Alternatively, the functions may be performed by one or more other processing units (or cores), on at least one integrated circuit (IC). In other embodiments, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

The receiver 505 may receive information such as packets, user data, or control information associated with various information channels (e.g., control channels, data channels, and information related to DC subcarrier handling in narrowband devices, etc.). Information may be passed on to the DC subcarrier handling module 510, and to other components of UE 115-*b*. In some examples, the receiver 505 may receive a downlink transmission on subcarriers of the narrow bandwidth region. In some examples, the receiver 505 may receive system information on a center bandwidth region of the wide bandwidth carrier. In some examples, the receiver 505 may receive an indication of the narrowband region from a base station, wherein identifying the narrow bandwidth region is based on the received indication. In some examples, the receiver 505 may receive a downlink transmission on subcarriers of the narrow bandwidth region. In some examples, the receiver 505 may receive system information on a center bandwidth region of the wide bandwidth carrier. In some examples, the receiver 505 may receive an indication of the narrowband region from a base station, wherein identifying the narrow bandwidth region is based on the received indication.

The DC subcarrier handling module 510 may identify a narrow bandwidth region allocated for operation within a wide bandwidth carrier, determine that the narrow bandwidth region is centered about a different frequency than a center subcarrier of the wide bandwidth carrier, and select an operating mode associated with a center frequency of the narrow bandwidth region based at least in part on the determining.

The transmitter 515 may transmit signals received from other components of UE 115-*b*. In some embodiments, the transmitter 515 may be collocated with the receiver 505 in a transceiver module. The transmitter 515 may include a single antenna, or it may include a plurality of antennas. In some examples, the transmitter 515 may transmit an empty subcarrier at a center frequency of the narrow bandwidth region.

Figure 6:
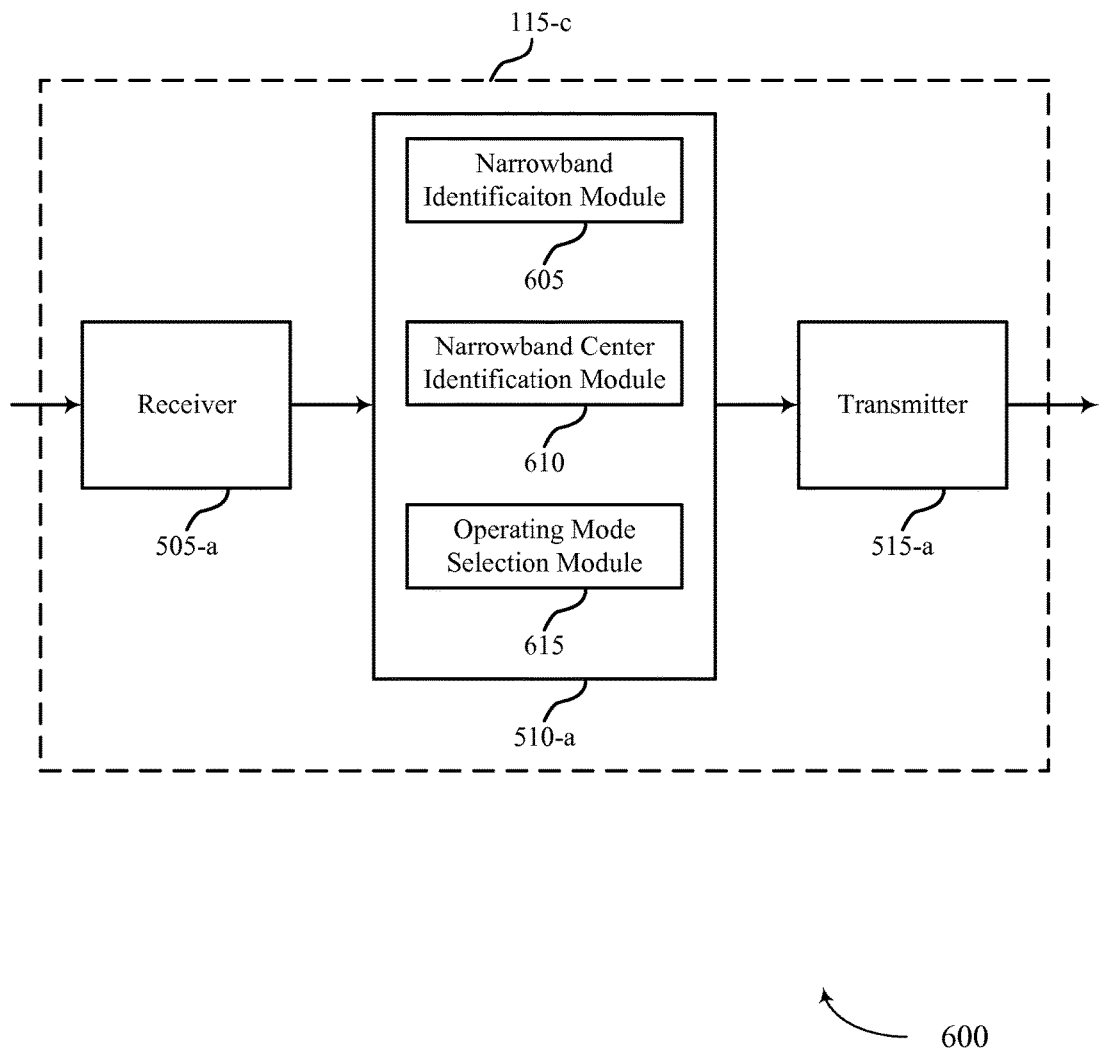
FIG. 6 shows a block diagram of a UE configured for DC subcarrier handling in narrowband devices in accordance with various aspects of the present disclosure.

FIG. 6 shows a block diagram 600 of a UE 115-*c* for DC subcarrier handling in narrowband devices in accordance with various aspects of the present disclosure. UE 115-*c* may be an example of aspects of a UE 115 described with reference to FIGS. 1-5. UE 115-*c* may include a receiver 505-*a*, a DC subcarrier handling module 510-*a*, or a transmitter 515-*a*. UE 115-*c* may also include a processor. Each of these components may be in communication with each other. The DC subcarrier handling module 510-*a* may also include a narrowband identification module 605, a narrowband center identification module 610, and an operating mode selection module 615.

The components of UE 115-*c* may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The receiver 505-*a* may receive information which may be passed on to DC subcarrier handling module 510-*a*, and to other components of UE 115-*c*. The DC subcarrier handling module 510-*a* may perform the operations described above with reference to FIG. 5. The transmitter 515-*a* may transmit signals received from other components of UE 115-*c*.

The narrowband identification module 605 may identify a narrow bandwidth region allocated for operation within a wide bandwidth carrier as described above with reference to FIGS. 2-4.

The narrowband center identification module 610 may determine that the narrow bandwidth region is centered about a different frequency than a center subcarrier of the wide bandwidth carrier as described above with reference to FIGS. 2-4. This may be based on the received system information and identifying the narrow bandwidth region. In some cases, the narrowband center identification module 610 may determine that the narrow bandwidth region comprises the center subcarrier of the wide bandwidth carrier. The narrowband center identification module 610 may also determine that the narrow bandwidth region excludes the center subcarrier of the wide bandwidth carrier, which may be based on the received system information and identifying the narrow bandwidth region.

The operating mode selection module 615 may select an operating mode associated with a center frequency of the narrow bandwidth region based at least in part on the determining as described above with reference to FIGS. 2-4.

Figure 7:
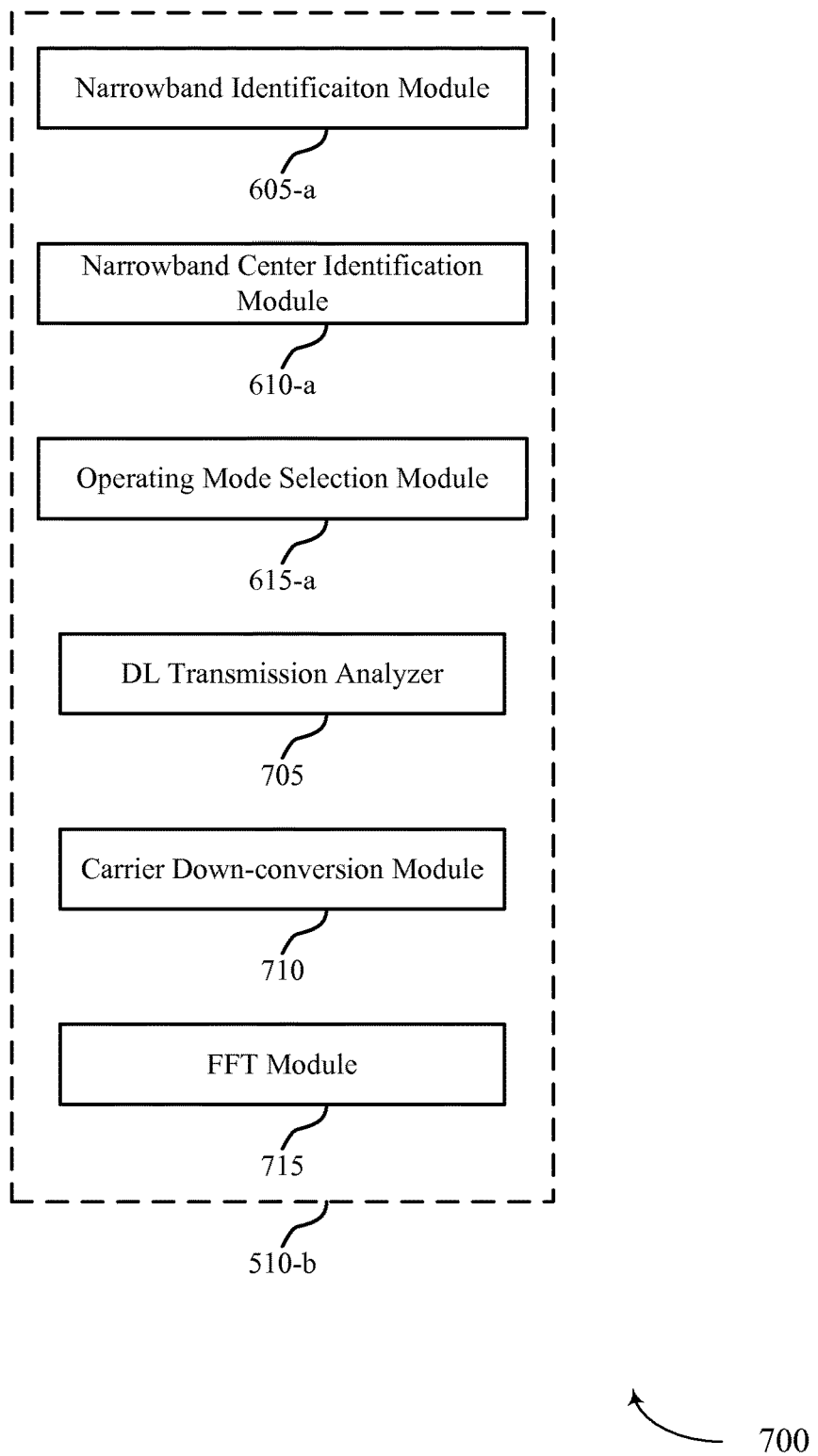
FIG. 7 shows a block diagram of a DC subcarrier handling module configured for DC subcarrier handling in narrowband devices in accordance with various aspects of the present disclosure.

FIG. 7 shows a block diagram 700 of a DC subcarrier handling module 510-*b* for DC subcarrier handling in narrowband devices in accordance with various aspects of the present disclosure. The DC subcarrier handling module 510-*b* may be an example of aspects of a DC subcarrier handling module 510 described with reference to FIGS. 5-6. The DC subcarrier handling module 510-*b* may include a narrowband identification module 605-*a*, a narrowband center identification module 610-*a*, and an operating mode selection module 615-*a*. Each of these modules may perform the functions described above with reference to FIG. 6. The DC subcarrier handling module 510-*b* may also include a DL transmission analyzer 705, a carrier down-conversion module 710, and a FFT module 715.

The components of the DC subcarrier handling module 510-*b* may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The DL transmission analyzer 705 may analyze the received downlink transmission based at least in part on the determination that the narrow bandwidth region comprises the center subcarrier of the wide bandwidth carrier as described above with reference to FIGS. 2-4. The DL transmission analyzer 705 may also analyze the received downlink transmission based at least in part on the determination that the narrow bandwidth region excludes the center subcarrier of the wide bandwidth carrier.

The carrier down-conversion module 710 may be configured such that analyzing the received downlink transmission may include down-converting a carrier frequency of the allocated narrow band region such that the center subcarrier of the wide bandwidth carrier may be effectively centered within the narrow bandwidth region as described above with reference to FIGS. 2-4. In some examples, analyzing the received downlink transmission comprises down-converting the allocated narrow band region such that the center subcarrier of the wide bandwidth carrier may be adjacent to the narrow bandwidth region, wherein the down-converting may be based on a carrier frequency, a bandwidth of the narrow bandwidth region, and a configurable value.

The FFT module 715 may adjust a FFT operation based on a location of the center subcarrier of the wide bandwidth carrier as described above with reference to FIGS. 2-4. The FFT module 715 may also adjust a FFT operation based on a location of the center subcarrier of the wide bandwidth carrier.

Figure 8:
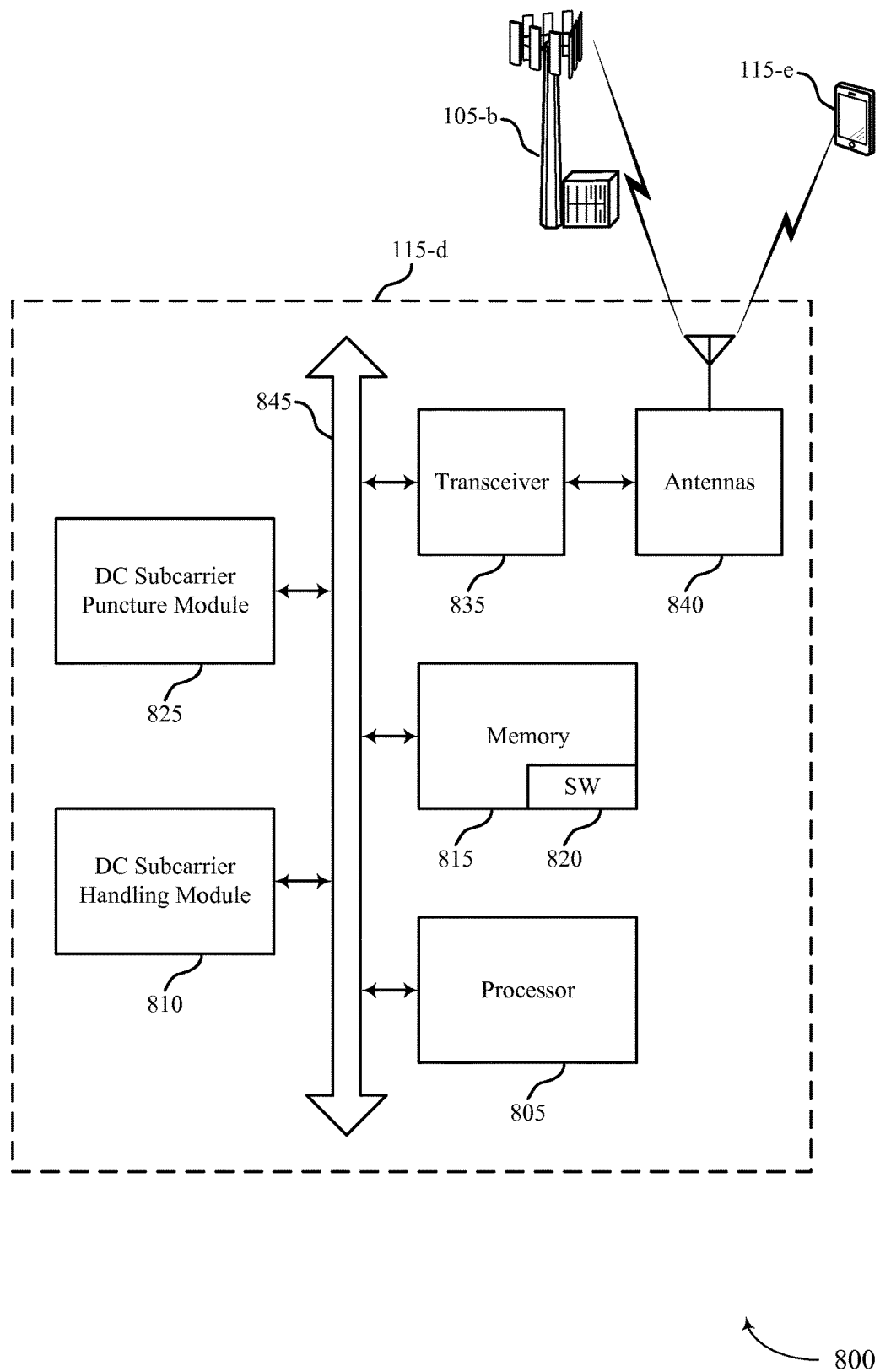
FIG. 8 illustrates a block diagram of a system including a UE configured for DC subcarrier handling in narrowband devices in accordance with various aspects of the present disclosure.

FIG. 8 shows a diagram of a system 800 including a UE 115 configured for DC subcarrier handling in narrowband devices in accordance with various aspects of the present disclosure. System 800 may include UE 115-*d*, which may be an example of a UE 115 described above with reference to FIGS. 1-7. UE 115-*d* may include a DC subcarrier handling module 810, which may be an example of a DC subcarrier handling module 510 described with reference to FIGS. 5-7. UE 115-*d* may also include a DC subcarrier handling module 825. UE 115-*d* may also include components for bi-directional voice and data communications including components for transmitting communications and components for receiving communications. For example, UE 115-*d* may communicate bi-directionally with UE 115-*e* or base station 105-*b*.

The DC subcarrier handling module 825 may be configured such that selecting the operating mode may include puncturing a set of REs corresponding to an expected direct current (DC) subcarrier location as described above with reference to FIGS. 2-4.

UE 115-*d* may also include a processor module 805, and memory 815 (including software (SW)) 820, a transceiver module 835, and one or more antenna(s) 840, each of which may communicate, directly or indirectly, with each other (e.g., via buses 845). The transceiver module 835 may communicate bi-directionally, via the antenna(s) 840 or wired or wireless links, with one or more networks, as described above. For example, the transceiver module 835 may communicate bi-directionally with a base station 105 or another UE 115. The transceiver module 835 may include a modem to modulate the packets and provide the modulated packets to the antenna(s) 840 for transmission, and to demodulate packets received from the antenna(s) 840. While UE 115-*d* may include a single antenna 840, UE 115-*d* may also have multiple antennas 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor module 805 to perform various functions described herein (e.g., DC subcarrier handling in narrowband devices, etc.). Alternatively, the software/firmware code 820 may not be directly executable by the processor module 805 but cause a computer (e.g., when compiled and executed) to perform functions described herein. The processor module 805 may include an intelligent hardware device, (e.g., a central processing unit (CPU), a microcontroller, an ASIC, etc.)

Figure 9:
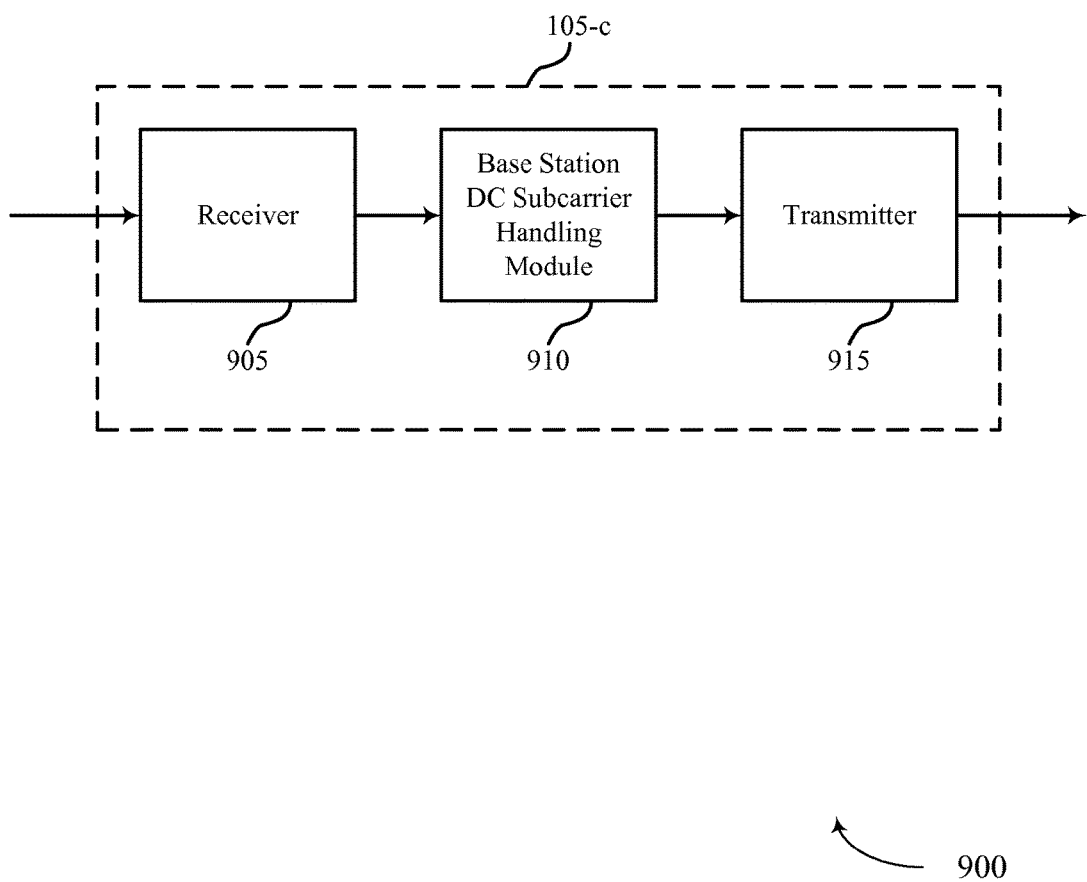
FIG. 9 shows a block diagram of a base station configured for DC subcarrier handling in narrowband devices in accordance with various aspects of the present disclosure.

FIG. 9 shows a block diagram 900 of a base station 105-*c* configured for DC subcarrier handling in narrowband devices in accordance with various aspects of the present disclosure. Base Station 105-*c* may be an example of aspects of a base station 105 described with reference to FIGS. 1-8. Base Station 105-*c* may include a receiver 905, a base station DC subcarrier handling module 910, or a transmitter 915. Base Station 105-*c* may also include a processor. Each of these components may be in communication with each other.

The components of base station 105-*c* may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The receiver 905 may receive information such as packets, user data, or control information associated with various information channels (e.g., control channels, data channels, and information related to DC subcarrier handling in narrowband devices, etc.). Information may be passed on to the base station DC subcarrier handling module 910, and to other components of base station 105-*c*. In some examples, the receiver 905 may receive a downlink transmission on subcarriers of the narrow bandwidth region. In some cases, the receiver 905 may receive system information on a center bandwidth region of the wide bandwidth carrier. In other examples, the receiver 905 may receive an indication of the narrowband region from a base station, where identifying the narrow bandwidth region is based on the received indication. In some examples, the receiver 905 may receive a downlink transmission on subcarriers of the narrow bandwidth region. In some cases, the receiver 905 may receive system information on a center bandwidth region of the wide bandwidth carrier.

The base station DC subcarrier handling module 910 may identify a narrow bandwidth region allocated for operation within a wide bandwidth carrier, determine that the narrow bandwidth region is centered about a different frequency than a center subcarrier of the wide bandwidth carrier, transmit an empty subcarrier at a center frequency of the narrow bandwidth region, and rate match subcarriers of the narrow bandwidth region around tones of the empty subcarrier.

The transmitter 915 may transmit signals received from other components of base station 105-*c*. In some embodiments, the transmitter 915 may be collocated with the receiver 905 in a transceiver module. The transmitter 915 may include a single antenna, or it may include a plurality of antennas. In some examples, the transmitter 915 may transmit an empty subcarrier at a center frequency of the narrow bandwidth region.

Figure 10:
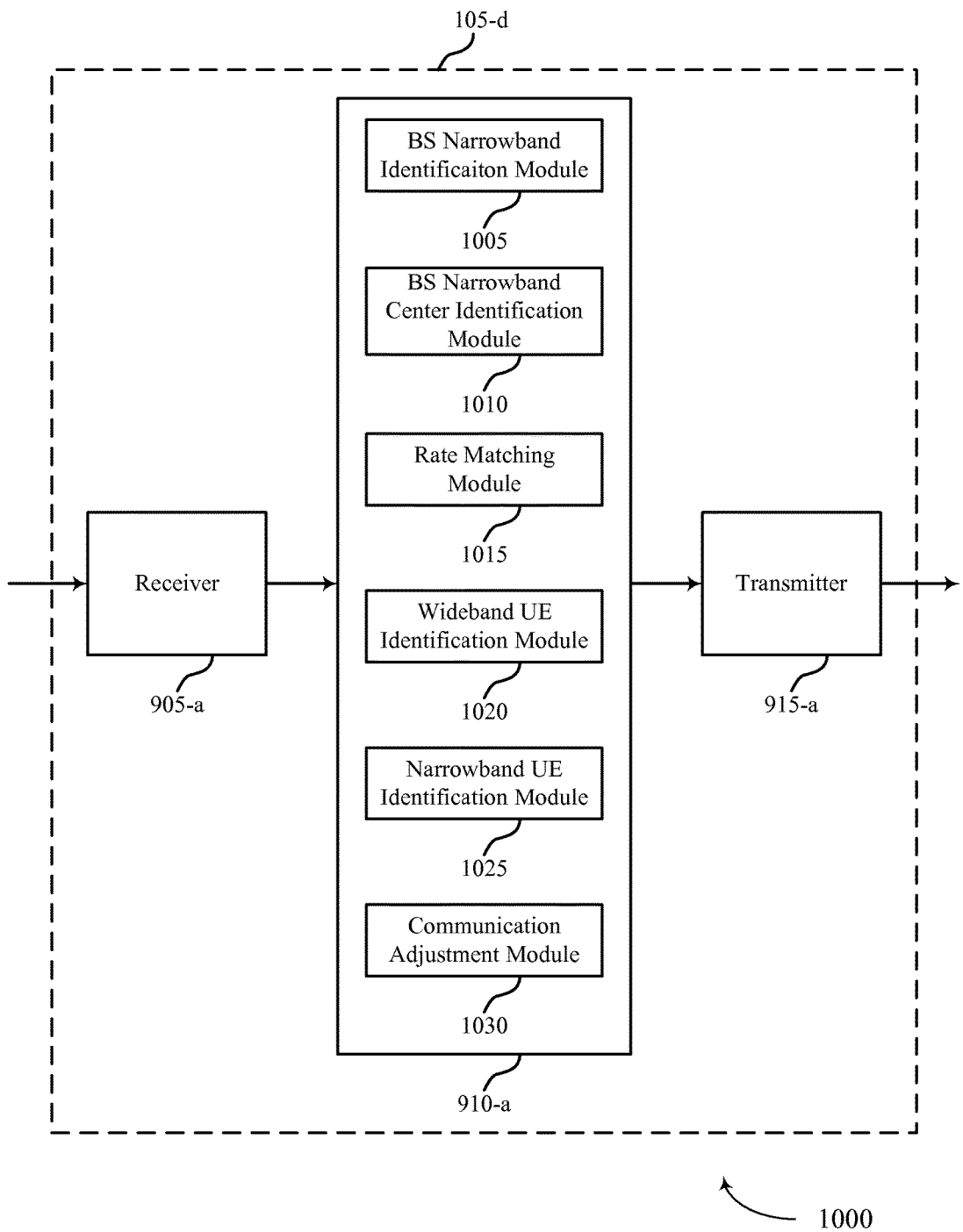
FIG. 10 shows a block diagram of a base station DC subcarrier handling module configured for DC subcarrier handling in narrowband devices in accordance with various aspects of the present disclosure.

FIG. 10 shows a block diagram 1000 of a base station 105-*d* for DC subcarrier handling in narrowband devices in accordance with various aspects of the present disclosure. Base Station 105-*d* may be an example of aspects of a base station 105 described with reference to FIGS. 1-9. Base Station 105-*d* may include a receiver 905-*a*, a base station DC subcarrier handling module 910-*a*, or a transmitter 915-*a*. Base Station 105-*d* may also include a processor. Each of these components may be in communication with each other. The base station DC subcarrier handling module 910-*a* may also include a BS narrowband identification module 1005, a BS narrowband center identification module 1010, a rate matching module 1015, a wideband UE identification module 1020, a narrowband UE identification module 1025, and a communication adjustment module 1030.

The components of base station 105-*d* may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The receiver 905-*a* may receive information, which may be passed on to base station DC subcarrier handling module 910-*a* and to other components of base station 105-*d*. The base station DC subcarrier handling module 910-*a* may perform the operations described above with reference to FIG. 9. The transmitter 915-*a* may transmit signals received from other components of base station 105-*d*.

The BS narrowband identification module 1005 may identify a narrow bandwidth region allocated for operation within a wide bandwidth carrier as described above with reference to FIGS. 2-4. The BS narrowband center identification module 1010 may determine that the narrow bandwidth region is centered about a different frequency than a center subcarrier of the wide bandwidth carrier as described above with reference to FIGS. 2-4.

The rate matching module 1015 may rate match subcarriers of the narrow bandwidth region around tones of the empty subcarrier as described above with reference to FIGS. 2-4. The wideband UE identification module 1020 may identify a wideband UE in communication with the first base station as described above with reference to FIGS. 2-4.

The narrowband UE identification module 1025 may determine that a narrowband UE is in communication with a second base station in the narrowband UE utilizing a narrow bandwidth region within a wide bandwidth carrier, where the narrow bandwidth region is centered about a different frequency than a center subcarrier of the wide bandwidth carrier as described above with reference to FIGS. 2-4. The communication adjustment module 1030 may adjust communication with the wideband UE based on determining that the narrowband UE is in communication with the second base station as described above with reference to FIGS. 2-4.

Figure 11:
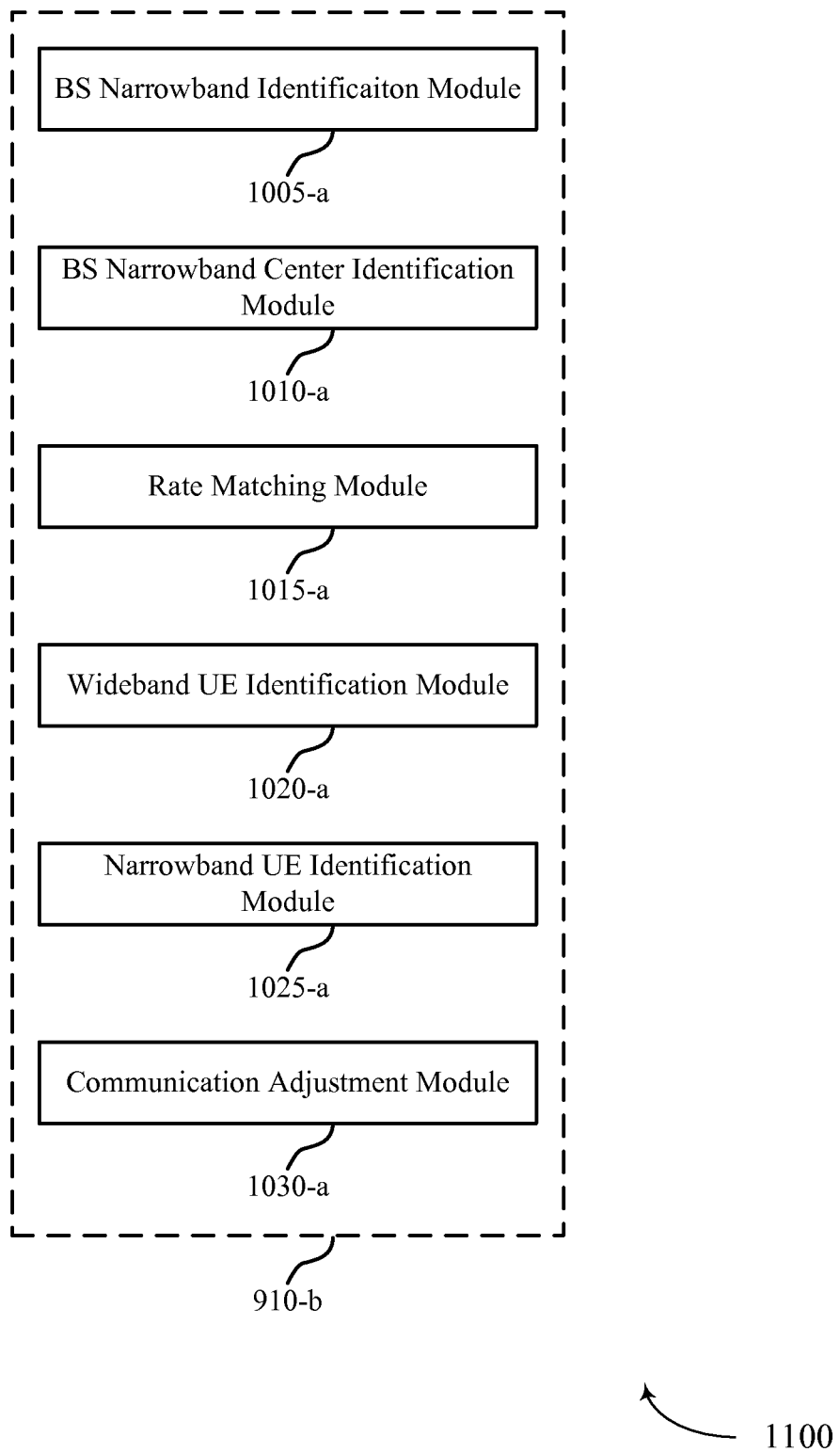
FIG. 11 shows a block diagram of a base station configured for DC subcarrier handling in narrowband devices in accordance with various aspects of the present disclosure.

FIG. 11 shows a block diagram 1100 of a base station DC subcarrier handling module 910-*b* for DC subcarrier handling in narrowband devices in accordance with various aspects of the present disclosure. The base station DC subcarrier handling module 910-*b* may be an example of aspects of a base station DC subcarrier handling module 910 described with reference to FIGS. 9-10. The base station DC subcarrier handling module 910-*b* may include a BS narrowband identification module 1005-*a*, a BS narrowband center identification module 1010-*a*, a rate matching module 1015-*a*, a wideband UE identification module 1020-*a*, a narrowband UE identification module 1025-*a*, and a communication adjustment module 1030-*a*. Each of these modules may perform the functions described above with reference to FIG. 10.

The components of the base station DC subcarrier handling module 910-*b* may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

Figure 12:
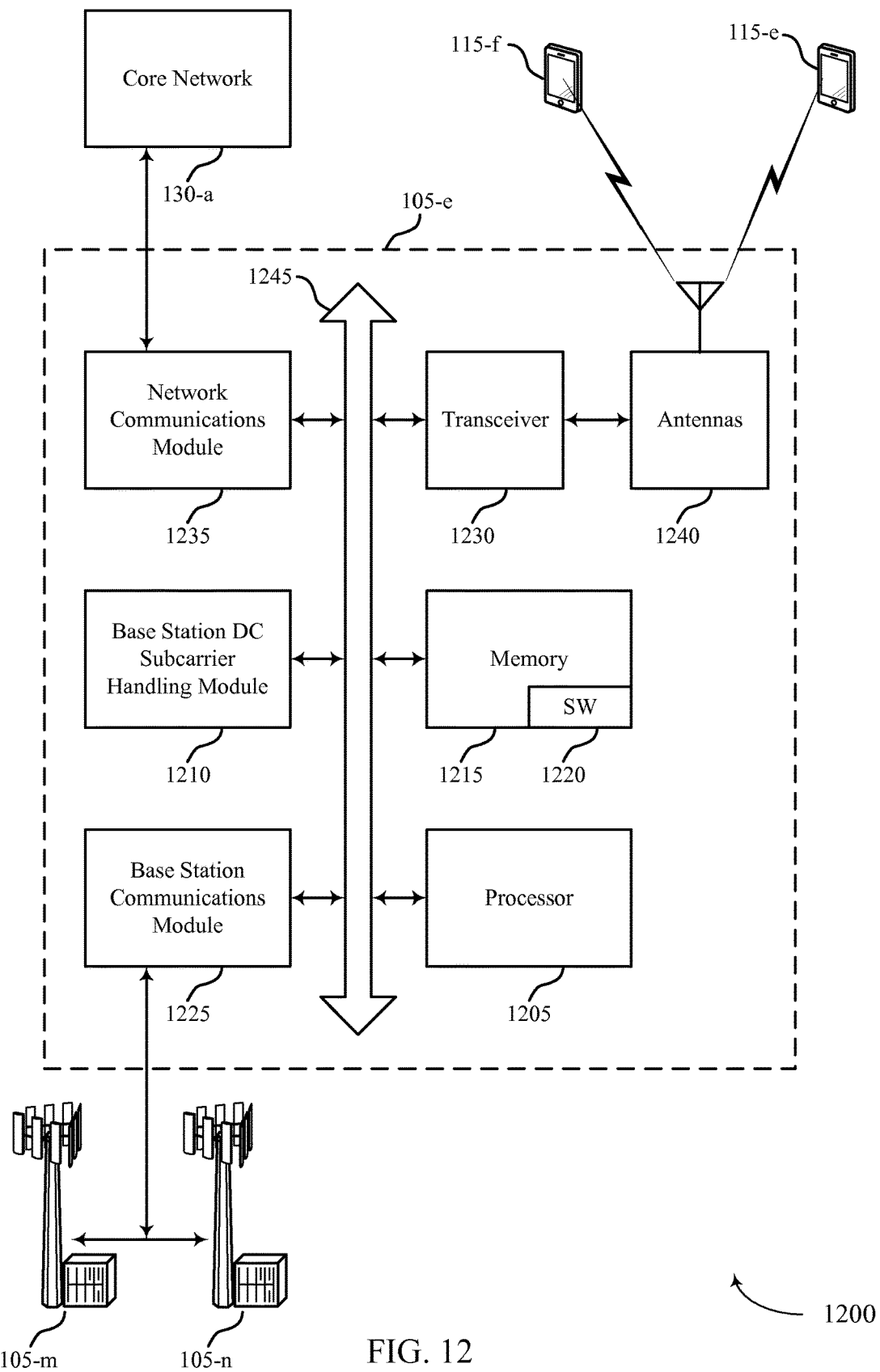
FIG. 12 illustrates a block diagram of a system including a base station configured for DC subcarrier handling in narrowband devices in accordance with various aspects of the present disclosure.

FIG. 12 shows a diagram of a system 1200 including a base station 105 configured for DC subcarrier handling in narrowband devices in accordance with various aspects of the present disclosure. System 1200 may include base station 105-*e*, which may be an example of a base station 105 described above with reference to FIGS. 1-11. Base station 105-*e* may include a base station DC subcarrier handling module 1210, which may be an example of a base station DC subcarrier handling module 910 described with reference to FIGS. 9-11. Base Station 105-*e* may also include components for bi-directional voice and data communications including components for transmitting communications and components for receiving communications. For example, base station 105-*e* may communicate bi-directionally with base station 105-*m* or base station 105-*n*.

In some cases, base station 105-*e* may have one or more wired backhaul links. Base station 105-*e* may have a wired backhaul link (e.g., S1 interface, etc.) to the core network 130. Base station 105-*e* may also communicate with other base stations 105, such as base station 105-*m* and base station 105-*n* via inter-base station backhaul links (e.g., an X2 interface). Each of the base stations 105 may communicate with UEs 115 using the same or different wireless communications technologies. In some cases, base station 105-*e* may communicate with other base stations such as 105-*m* or 105-*n* utilizing base station communications module 1225. In some embodiments, base station communications module 1225 may provide an X2 interface within an LTE/LTE-A wireless communication network technology to provide communication between some of the base stations 105. In some embodiments, base station 105-*e* may communicate with other base stations through core network 130. In some cases, base station 105-*e* may communicate with the core network 130 through network communications module 1235.

The base station 105-*e* may include a processor module 1205, memory 1215 (including software (SW) 1220), transceiver modules 1230, and antenna(s) 1240, which each may be in communication, directly or indirectly, with each other (e.g., over bus system 1245). The transceiver modules 1230 may be configured to communicate bi-directionally, via the antenna(s) 1240, with the UEs 115, which may be multimode devices. The transceiver module 1230 (or other components of the base station 105-*e*) may also be configured to communicate bi-directionally, via the antennas 1240, with one or more other base stations (not shown). The transceiver module 1230 may include a modem configured to modulate the packets and provide the modulated packets to the antennas 1240 for transmission, and to demodulate packets received from the antennas 1240. The base station 105-*e* may include multiple transceiver modules 1230, each with one or more associated antennas 1240. The transceiver module may be an example of a combined receiver 905 and transmitter 915 of FIG. 9.

The memory 1215 may include RAM and ROM. The memory 1215 may also store computer-readable, computer-executable software code 1220 containing instructions that are configured to, when executed, cause the processor module 1205 to perform various functions described herein (e.g., DC subcarrier handling in narrowband devices, selecting coverage enhancement techniques, call processing, database management, message routing, etc.). Alternatively, the software code 1220 may not be directly executable by the processor module 1205 but be configured to cause the computer, e.g., when compiled and executed, to perform functions described herein. The processor module 1205 may include an intelligent hardware device, e.g., a CPU, a microcontroller, an ASIC, etc. The processor module 1205 may include various special purpose processors such as encoders, queue processing modules, base band processors, radio head controllers, digital signal processor (DSPs), and the like.

The base station communications module 1225 may manage communications with other base stations 105. The communications management module may include a controller or scheduler for controlling communications with UEs 115 in cooperation with other base stations 105. For example, the base station communications module 1225 may coordinate scheduling for transmissions to UEs 115 for various interference mitigation techniques such as beamforming or joint transmission.

Figure 13:
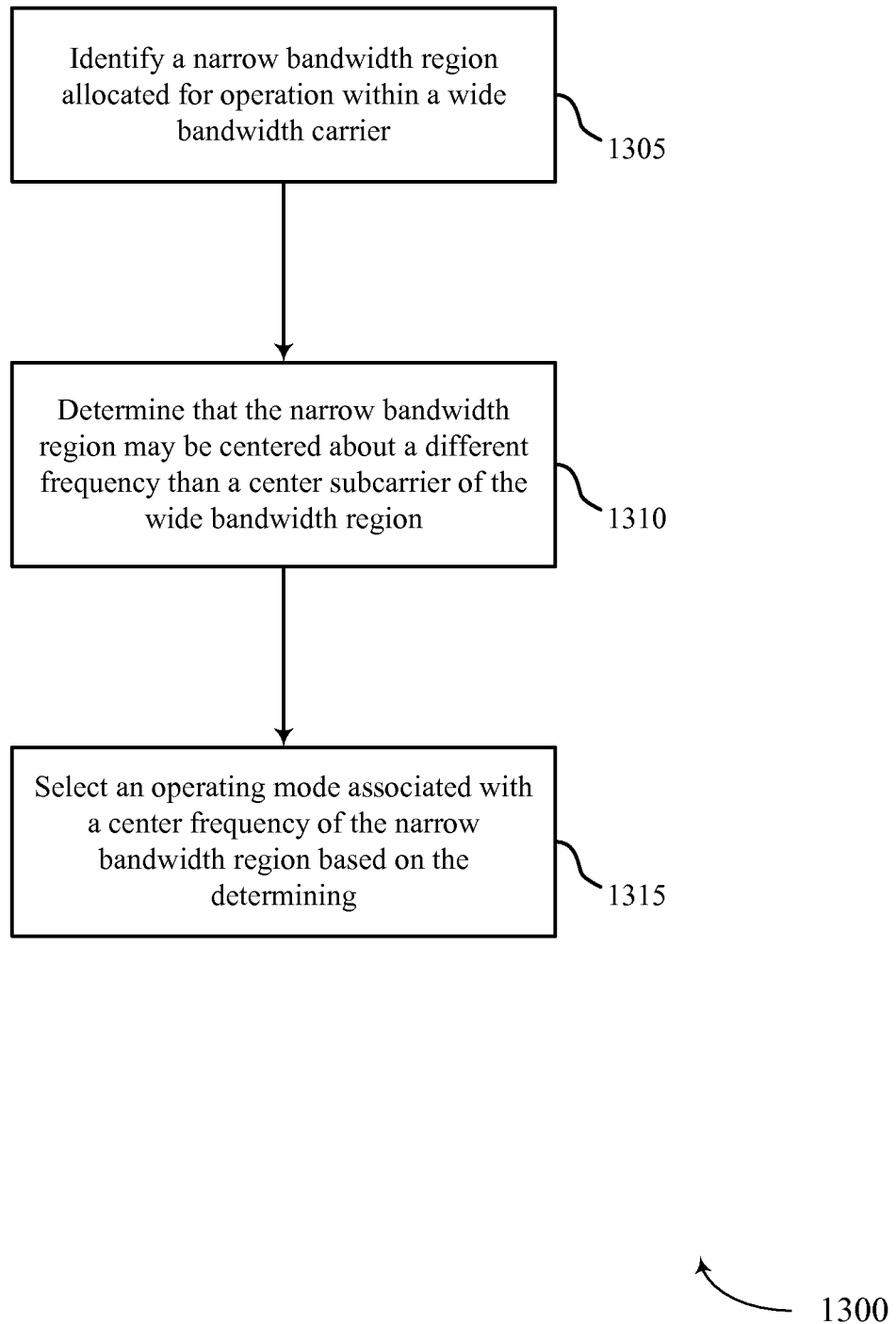
FIG. 13 shows a flowchart illustrating a method for DC subcarrier handling in narrowband devices in accordance with various aspects of the present disclosure.

FIG. 13 shows a flowchart illustrating a method 1300 for DC subcarrier handling in narrowband devices in accordance with various aspects of the present disclosure. The operations of method 1300 may be implemented by a UE 115 or its components as described with reference to FIGS. 1-12. For example, the operations of method 1300 may be performed by the DC subcarrier handling module 510 as described with reference to FIGS. 5-9. In some examples, a UE 115 may execute a set of codes to control the functional elements of the UE 115 to perform the functions described below. Additionally or alternatively, the UE 115 may perform aspects the functions described below using special-purpose hardware.

At block 1305, the UE 115 may identify a narrow bandwidth region allocated for operation within a wide bandwidth carrier as described above with reference to FIGS. 2-4. In certain examples, the operations of block 1305 may be performed by the narrowband identification module 605 as described above with reference to FIG. 6.

At block 1310, the UE 115 may determine that the narrow bandwidth region is centered about a different frequency than a center subcarrier of the wide bandwidth carrier as described above with reference to FIGS. 2-4. In certain examples, the operations of block 1310 may be performed by the narrowband center identification module 610 as described above with reference to FIG. 6.

At block 1315, the UE 115 may select an operating mode associated with a center frequency of the narrow bandwidth region based at least in part on the determining as described above with reference to FIGS. 2-4. In certain examples, the operations of block 1315 may be performed by the operating mode selection module 615 as described above with reference to FIG. 6.

Figure 14:
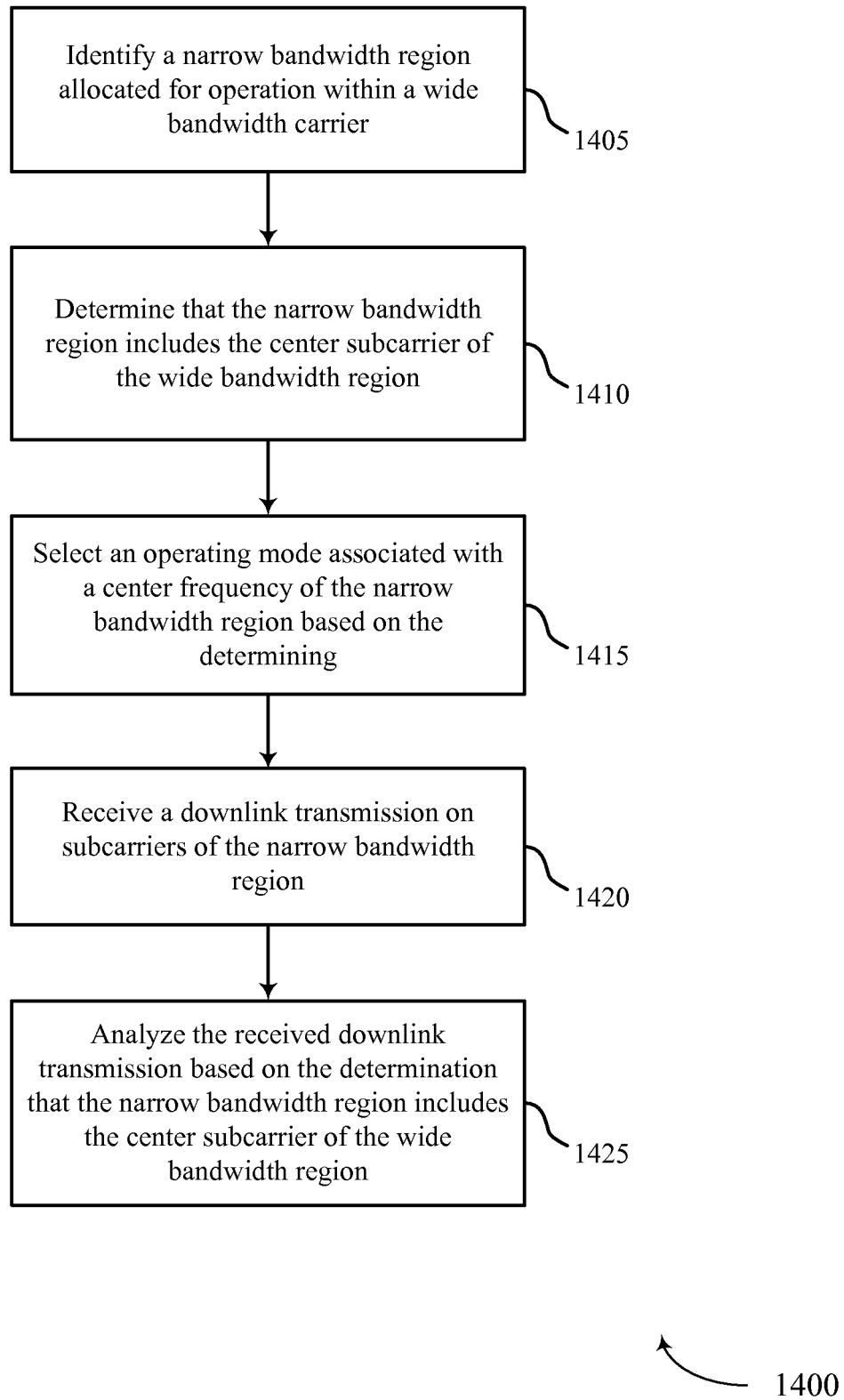
FIG. 14 shows a flowchart illustrating a method for DC subcarrier handling in narrowband devices in accordance with various aspects of the present disclosure.

FIG. 14 shows a flowchart illustrating a method 1400 for DC subcarrier handling in narrowband devices in accordance with various aspects of the present disclosure. The operations of method 1400 may be implemented by a UE 115 or its components as described with reference to FIGS. 1-12. For example, the operations of method 1400 may be performed by the DC subcarrier handling module 510 as described with reference to FIGS. 5-9. In some examples, a UE 115 may execute a set of codes to control the functional elements of the UE 115 to perform the functions described below. Additionally or alternatively, the UE 115 may perform aspects the functions described below using special-purpose hardware. The method 1400 may also incorporate aspects of method 1300 of FIG. 13.

At block 1405, the UE 115 may identify a narrow bandwidth region allocated for operation within a wide bandwidth carrier as described above with reference to FIGS. 2-4. In certain examples, the operations of block 1405 may be performed by the narrowband identification module 605 as described above with reference to FIG. 6.

At block 1410, the UE 115 may determine that the narrow bandwidth region comprises the center subcarrier of the wide bandwidth carrier as described above with reference to FIGS. 2-4. In certain examples, the operations of block 1410 may be performed by the narrowband center identification module 610 as described above with reference to FIG. 6.

At block 1415, the UE 115 may select an operating mode associated with a center frequency of the narrow bandwidth region based at least in part on the determining as described above with reference to FIGS. 2-4. In certain examples, the operations of block 1415 may be performed by the operating mode selection module 615 as described above with reference to FIG. 6.

At block 1420, the UE 115 may receive a downlink transmission on subcarriers of the narrow bandwidth region as described above with reference to FIGS. 2-4. In certain examples, the operations of block 1420 may be performed by the receiver 505 as described above with reference to FIG. 5.

At block 1425, the UE 115 may analyze the received downlink transmission based at least in part on the determination that the narrow bandwidth region comprises the center subcarrier of the wide bandwidth carrier as described above with reference to FIGS. 2-4. In certain examples, the operations of block 1425 may be performed by the DL transmission analyzer 705 as described above with reference to FIG. 7.

Figure 15:
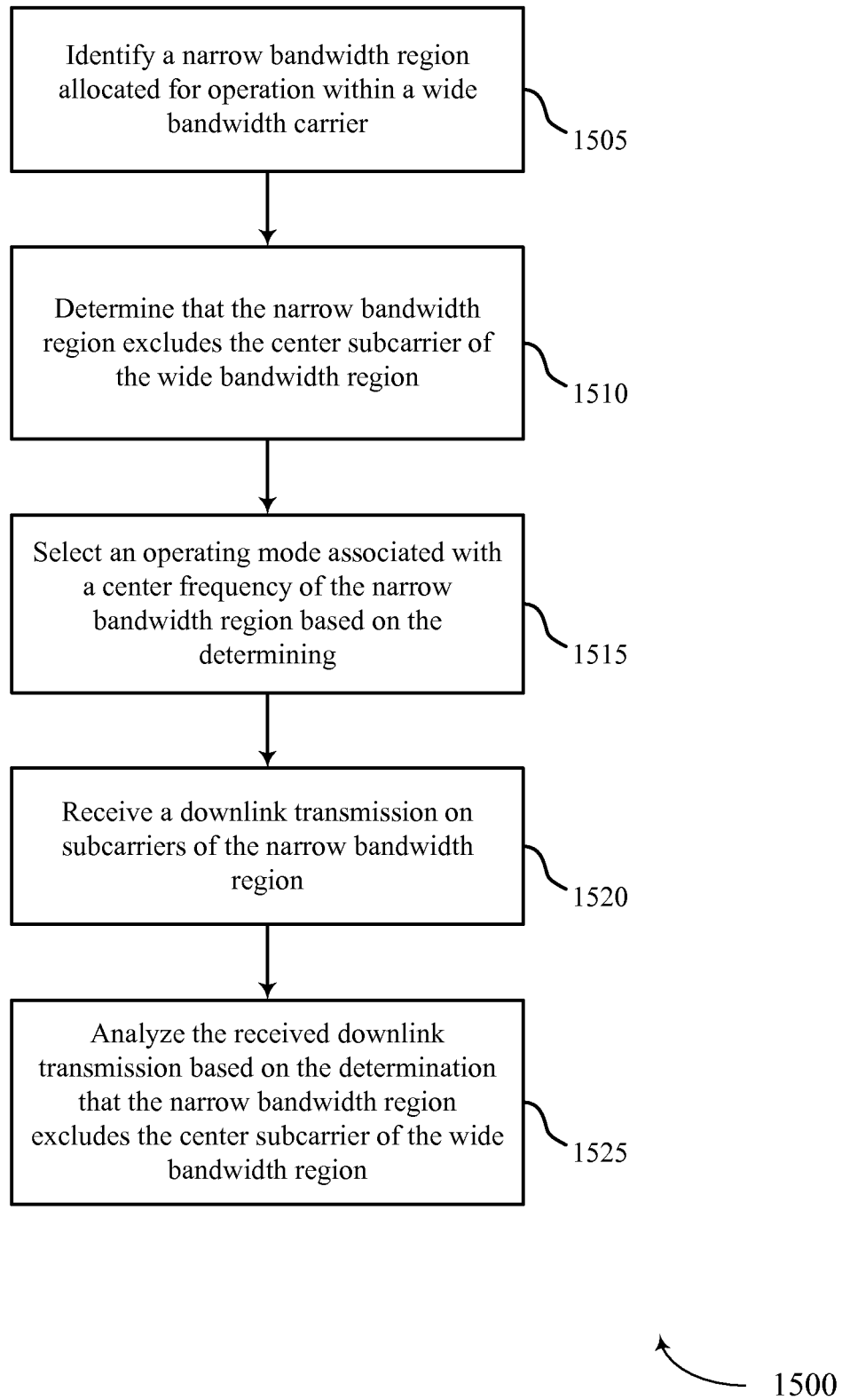
FIG. 15 shows a flowchart illustrating a method for DC subcarrier handling in narrowband devices in accordance with various aspects of the present disclosure.

FIG. 15 shows a flowchart illustrating a method 1500 for DC subcarrier handling in narrowband devices in accordance with various aspects of the present disclosure. The operations of method 1500 may be implemented by a UE 115 or its components as described with reference to FIGS. 1-12. For example, the operations of method 1500 may be performed by the DC subcarrier handling module 510 as described with reference to FIGS. 5-9. In some examples, a UE 115 may execute a set of codes to control the functional elements of the UE 115 to perform the functions described below. Additionally or alternatively, the UE 115 may perform aspects the functions described below using special-purpose hardware. The method 1500 may also incorporate aspects of methods 1300 and 1400 of FIGS. 13-14.

At block 1505, the UE 115 may identify a narrow bandwidth region allocated for operation within a wide bandwidth carrier as described above with reference to FIGS. 2-4. In certain examples, the operations of block 1505 may be performed by the narrowband identification module 605 as described above with reference to FIG. 6.

At block 1510, the UE 115 may determine that the narrow bandwidth region excludes the center subcarrier of the wide bandwidth carrier as described above with reference to FIGS. 2-4. In certain examples, the operations of block 1510 may be performed by the narrowband center identification module 610 as described above with reference to FIG. 6.

At block 1515, the UE 115 may select an operating mode associated with a center frequency of the narrow bandwidth region based at least in part on the determining as described above with reference to FIGS. 2-4. In certain examples, the operations of block 1515 may be performed by the operating mode selection module 615 as described above with reference to FIG. 6.

At block 1520, the UE 115 may receive a downlink transmission on subcarriers of the narrow bandwidth region as described above with reference to FIGS. 2-4. In certain examples, the operations of block 1520 may be performed by the receiver 505 as described above with reference to FIG. 5.

At block 1525, the UE 115 may analyze the received downlink transmission based at least in part on the determination that the narrow bandwidth region excludes the center subcarrier of the wide bandwidth carrier as described above with reference to FIGS. 2-4. In certain examples, the operations of block 1525 may be performed by the DL transmission analyzer 705 as described above with reference to FIG. 7.

Figure 16:
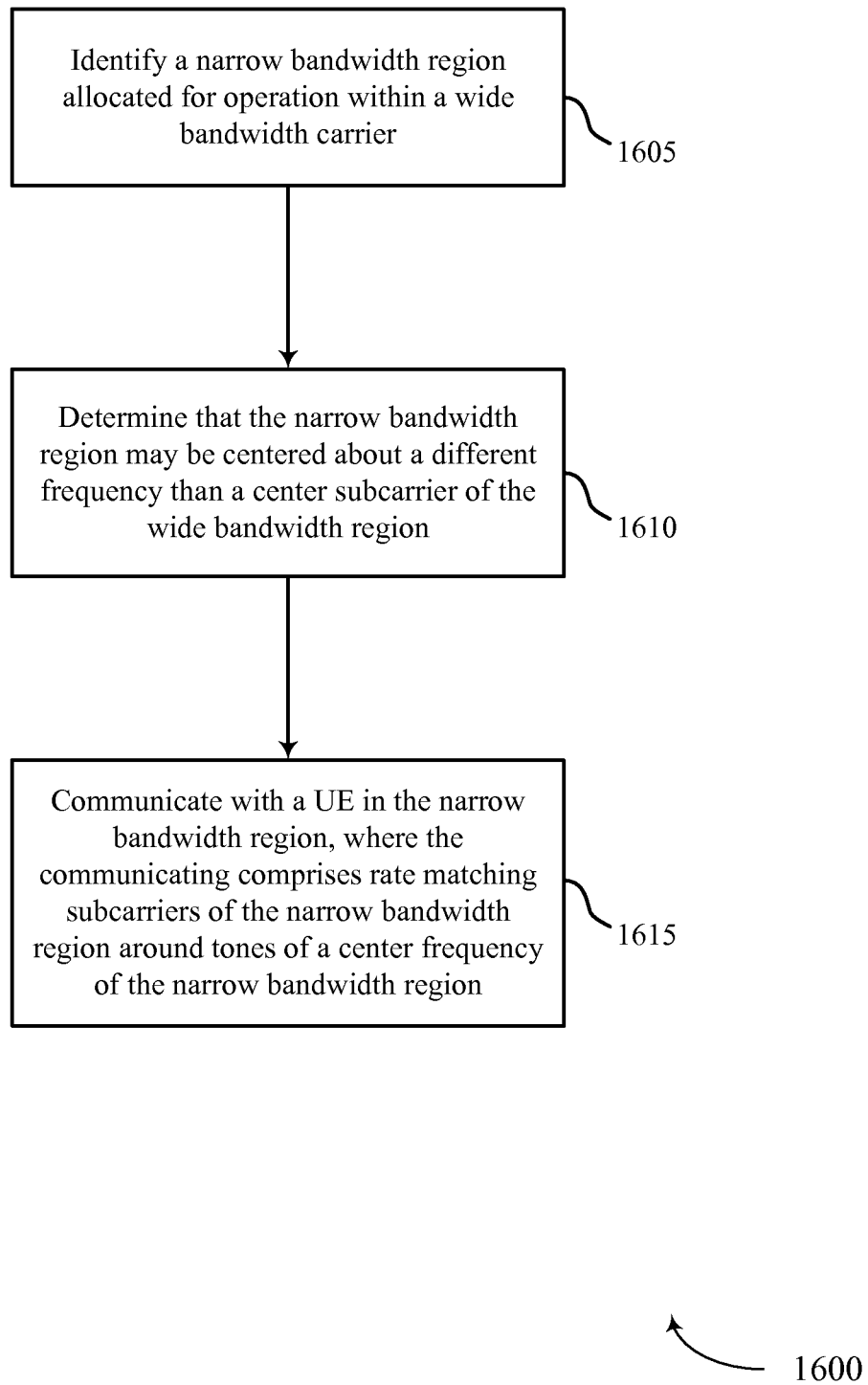
FIG. 16 shows a flowchart illustrating a method for DC subcarrier handling in narrowband devices in accordance with various aspects of the present disclosure.

FIG. 16 shows a flowchart illustrating a method 1600 for DC subcarrier handling in narrowband devices in accordance with various aspects of the present disclosure. The operations of method 1600 may be implemented by a base station 105 or its components as described with reference to FIGS. 1-12. For example, the operations of method 1600 may be performed by the base station DC subcarrier handling module 910 as described with reference to FIGS. 9-13. In some examples, a base station 105 may execute a set of codes to control the functional elements of the base station 105 to perform the functions described below. Additionally or alternatively, the base station 105 may perform aspects the functions described below using special-purpose hardware. The method 1600 may also incorporate aspects of methods 1300, 1400, and 1500 of FIGS. 13-15.

At block 1605, the base station 105 may identify a narrow bandwidth region allocated for operation within a wide bandwidth carrier as described above with reference to FIGS. 2-4. In some cases, the base station 105 may transmit an indication of the narrowband region to a UE 115. In other examples, the base station 105 may transmit system information on a center bandwidth region of the wide bandwidth carrier. In certain examples, the operations of block 1605 may be performed by the narrowband identification module 605 as described above with reference to FIG. 6 or the transmitter 915 as described above with reference to FIG. 9.

At block 1610, the base station 105 may determine that the narrow bandwidth region is centered about a different frequency than a center subcarrier of the wide bandwidth carrier as described above with reference to FIGS. 2-4. In certain examples, the operations of block 1610 may be performed by the narrowband center identification module 610 as described above with reference to FIG. 6.

At block 1615, the base station 105 may communicate with a UE in the narrow bandwidth region, where the communicating comprises rate matching subcarriers of the narrow bandwidth region around tones of a center frequency of the narrow bandwidth region as described above with reference to FIGS. 2-4. In some examples, the communicating may include transmitting an empty subcarrier at the center frequency of the narrow bandwidth region. The communicating may also include transmitting a downlink transmission on subcarriers of the narrow bandwidth region. In certain examples, the operations of block 1615 may be performed by the transmitter 915 as described above with reference to FIG. 9 or the rate matching module 1015 as described above with reference to FIG. 10.

Figure 17:
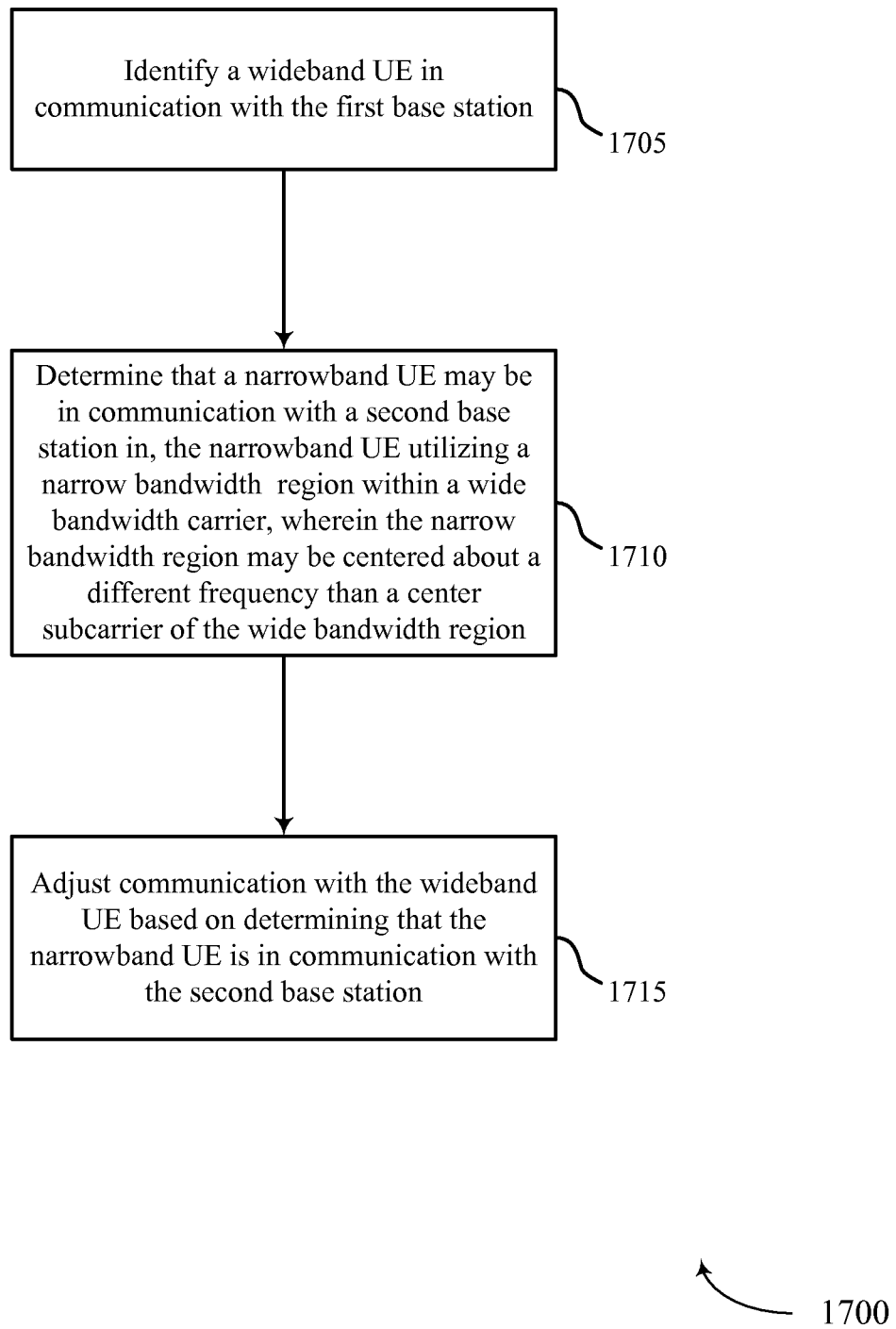
FIG. 17 shows a flowchart illustrating a method for DC subcarrier handling in narrowband devices in accordance with various aspects of the present disclosure.

FIG. 17 shows a flowchart illustrating a method 1700 for DC subcarrier handling in narrowband devices in accordance with various aspects of the present disclosure. The operations of method 1700 may be implemented by a base station 105 or its components as described with reference to FIGS. 1-12. For example, the operations of method 1700 may be performed by the base station DC subcarrier handling module 910 as described with reference to FIGS. 9-13. In some examples, a base station 105 may execute a set of codes to control the functional elements of the base station 105 to perform the functions described below. Additionally or alternatively, the base station 105 may perform aspects the functions described below using special-purpose hardware. The method 1700 may also incorporate aspects of methods 1300, 1400, 1500, and 1600 of FIGS. 13-16.

At block 1705, the base station 105 may identify a wideband UE in communication with the first base station as described above with reference to FIGS. 2-4. In certain examples, the operations of block 1705 may be performed by the wideband UE identification module 1020 as described above with reference to FIG. 1.

At block 1710, the base station 105 may determine that a narrowband UE is in communication with a second base station in, the narrowband UE utilizing a narrow bandwidth region within a wide bandwidth carrier, wherein the narrow bandwidth region is centered about a different frequency than a center subcarrier of the wide bandwidth carrier as described above with reference to FIGS. 2-4. In certain examples, the operations of block 1710 may be performed by the narrowband UE identification module 1025 as described above with reference to FIG. 1.

At block 1715, the base station 105 may adjust communication with the wideband UE based at least in part on determining that the narrowband UE is in communication with the second base station as described above with reference to FIGS. 2-4. In certain examples, the operations of block 1715 may be performed by the communication adjustment module 1030 as described above with reference to FIG. 1.

Thus, methods 1300, 1400, 1500, 1600, and 1700 may provide for DC subcarrier handling in narrowband devices. It should be noted that methods 1300, 1400, 1500, 1600, and 1700 describe possible implementation, and that the operations and the steps may be rearranged or otherwise modified such that other implementations are possible. In some examples, aspects from two or more of the methods 1300, 1400, 1500, 1600, and 1700 may be combined.

The detailed description set forth above in connection with the appended drawings describes exemplary embodiments and does not represent all the embodiments that may be implemented or that are within the scope of the claims.

The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as CDMA, time division multiple access (TDMA), frequency division multiple access (FDMA), OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of UMTS that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of wireless communication at a user equipment (UE), comprising:
receiving system information on a center bandwidth region of a wide bandwidth carrier;
identifying a narrow bandwidth region allocated for operation within the wide bandwidth carrier and a direct current (DC) subcarrier of the wide bandwidth carrier based at least in part on the received system information;

comparing a center frequency of the narrow bandwidth region with the DC subcarrier within the wide bandwidth carrier based at least in part on the received system information; and selecting an operating mode associated with the center frequency of the narrow bandwidth region based at least in part on the comparison.

2. The method of claim 1, wherein selecting the operating mode comprises:

puncturing a set of resource element (REs) at the DC subcarrier location.

3. The method of claim 1, further comprising:

determining that the narrow bandwidth region comprises the DC subcarrier within the wide bandwidth carrier;

receiving a downlink transmission on subcarriers of the narrow bandwidth region; and analyzing the downlink transmission based at least in part on the determination that the narrow bandwidth region comprises the DC subcarrier within the wide bandwidth carrier.

4. The method of claim 3, wherein analyzing the downlink transmission comprises:

down-converting a carrier frequency of the narrow bandwidth region so that the DC subcarrier within the wide bandwidth carrier is effectively centered within the narrow bandwidth region.

5. The method of claim 4, further comprising:

adjusting a fast Fourier transform (FFT) operation based at least in part on a location of the DC subcarrier within the wide bandwidth carrier.

6. The method of claim 1, further comprising:

determining that the narrow bandwidth region excludes the DC subcarrier within the wide bandwidth carrier;

receiving a downlink transmission on subcarriers of the narrow bandwidth region; and analyzing the downlink transmission based at least in part on the determination that the narrow bandwidth region excludes the DC subcarrier within the wide bandwidth carrier.

7. The method of claim 6, wherein analyzing the downlink transmission comprises:

down-converting the narrow bandwidth region so that the DC subcarrier within the wide bandwidth carrier is adjacent to the narrow bandwidth region, wherein the down-converting is based at least in part on a frequency of the wide bandwidth carrier, a bandwidth of the narrow bandwidth region, and a configurable value.

8. The method of claim 7, further comprising:

adjusting a FFT operation based at least in part on a location of the DC subcarrier within the wide bandwidth carrier.

9. A method of wireless communication at a base station, comprising:

receiving system information on a center bandwidth region of a wide bandwidth carrier;

identifying a narrow bandwidth region allocated for operation within the wide bandwidth carrier and a direct current (DC) subcarrier of the wide bandwidth carrier based at least in part on the received system information;

comparing a center frequency of the narrow bandwidth region with the DC subcarrier within the wide bandwidth carrier based at least in part on the received system information; and communicating with a user equipment (UE) in the narrow bandwidth region by rate matching subcarriers of the narrow bandwidth region around tones of the center frequency of the narrow bandwidth region.

10. The method of claim 9, wherein communicating with the UE comprises:

transmitting an empty subcarrier at the center frequency of the narrow bandwidth region.

11. The method of claim 9, further comprising:

transmitting system information on a center bandwidth region of the wide bandwidth carrier.

12. The method of claim 9, further comprising:

transmitting an indication of the narrow bandwidth region to the UE.

13. The method of claim 9, wherein communicating with the UE in the narrow bandwidth region comprises:

transmitting downlink data on subcarriers of the narrow bandwidth region.

14. An apparatus for wireless communication at a user equipment (UE), comprising:

a processor;

memory in electronic communication with the processor; and instructions stored in the memory; wherein the instructions are executable by the processor to:

receive system information on a center bandwidth region of a wide bandwidth carrier;

identify a narrow bandwidth region allocated for operation within the wide bandwidth carrier and a direct current (DC) subcarrier of the wide bandwidth carrier based at least in part on the received system information;

compare a center frequency of the narrow bandwidth region with the DC subcarrier within the wide bandwidth carrier based at least in part on the received system information; and select an operating mode associated with the center frequency of the narrow bandwidth region based at least in part on the comparison.

15. The apparatus of claim 14, wherein the instructions are executable by the processor to:

puncture a set of resource element (REs) at the DC subcarrier location.

16. The apparatus of claim 14, wherein the instructions are executable by the processor to:

determine that the narrow bandwidth region comprises DC subcarrier within the wide bandwidth carrier;

receive a downlink transmission on subcarriers of the narrow bandwidth region; and analyze the downlink transmission based at least in part on the determination that the narrow bandwidth region comprises the DC subcarrier within the wide bandwidth carrier.

17. The apparatus of claim 16, wherein the instructions are executable by the processor to:

down-converting a carrier frequency of the narrow bandwidth region so that the DC subcarrier within the wide bandwidth carrier is effectively centered within the narrow bandwidth region.

18. The apparatus of claim 17, wherein the instructions are executable by the processor to:

adjust a fast Fourier transform (FFT) operation based at least in part on a location of the DC subcarrier within the wide bandwidth carrier.

19. The apparatus of claim 14, wherein the instructions are executable by the processor to:

determine that the narrow bandwidth region excludes the DC subcarrier within the wide bandwidth carrier;

receive a downlink transmission on subcarriers of the narrow bandwidth region; and analyze the downlink transmission based at least in part on the determination that the narrow bandwidth region excludes the DC subcarrier within the wide bandwidth carrier.

20. The apparatus of claim 19, wherein the instructions are executable by the processor to:

down-convert the narrow bandwidth region so that the DC subcarrier within the wide bandwidth carrier is adjacent to the narrow bandwidth region based at least in part on a frequency of the wide bandwidth carrier, a bandwidth of the narrow bandwidth region, and a configurable value.

21. The apparatus of claim 20, wherein the instructions are executable by the processor to:

adjust a FFT operation based at least in part on a location of the DC subcarrier within the wide bandwidth carrier.

22. An apparatus for wireless communication at a base station, comprising:

a processor;

memory in electronic communication with the processor; and instructions stored in the memory; wherein the instructions are executable by the processor to:

receive system information on a center bandwidth region of a wide bandwidth carrier;

identify a narrow bandwidth region allocated for operation within the wide bandwidth carrier and a direct current (DC) subcarrier of the wide bandwidth carrier based at least in part on the received system information;

compare a center frequency of the narrow bandwidth region with the DC subcarrier within the wide bandwidth carrier based at least in part on the received system information; and communicate with a user equipment (UE) in the narrow bandwidth region by rate matching subcarriers of the narrow bandwidth region around tones of the center frequency of the narrow bandwidth region.

23. The apparatus of claim 22, wherein the instructions are executable by the processor to:

transmit an empty subcarrier at the center frequency of the narrow bandwidth region.

24. The apparatus of claim 22, wherein the instructions are executable by the processor to:

transmit system information on a center bandwidth region of the wide bandwidth carrier.

25. The apparatus of claim 22, wherein the instructions are executable by the processor to:

transmit an indication of the narrow bandwidth region to the UE.

26. The apparatus of claim 22, wherein the instructions are executable by the processor to:

transmit downlink data on subcarriers of the narrow bandwidth region.

* * * * *